United States Patent
Shibasaki

(10) Patent No.: US 9,720,629 B2
(45) Date of Patent: Aug. 1, 2017

(54) PRINT DATA GENERATING APPARATUS, PRINT DATA GENERATING PROGRAM, AND PRINTING APPARATUS

(75) Inventor: Akira Shibasaki, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 1513 days.

(21) Appl. No.: 13/234,921

(22) Filed: Sep. 16, 2011

(65) Prior Publication Data
US 2012/0069399 A1 Mar. 22, 2012

(30) Foreign Application Priority Data

Sep. 17, 2010 (JP) ................................ 2010-208884
Sep. 16, 2011 (JP) ................................ 2011-202517

(51) Int. Cl.
  G06F 3/12 (2006.01)
(52) U.S. Cl.
  CPC .......... *G06F 3/1204* (2013.01); *G06F 3/1212* (2013.01); *G06F 3/1247* (2013.01); *G06F 3/1285* (2013.01); *G06F 2206/1514* (2013.01)
(58) Field of Classification Search
  USPC ....................................................... 358/1.15
  See application file for complete search history.

(56) References Cited

U.S. PATENT DOCUMENTS 6,805,502 B2 * 10/2004 Rai et al. ..................... 400/61
2002/0135791 A1 * 9/2002 Rodriquez .................. 358/1.12
2003/0048492 A1 3/2003 Maeda et al.
2003/0161002 A1 * 8/2003 Nishiwaki et al. ......... 358/1.15
2009/0161163 A1 * 6/2009 Klassen et al. ............. 358/1.18
2011/0122433 A1 * 5/2011 Klassen ...................... 358/1.15

FOREIGN PATENT DOCUMENTS

| JP | 11-110171 A | 4/1999 |
| JP | 2002-091748 A | 3/2002 |
| JP | 2003-087536 A | 3/2003 |
| JP | 2003-150367 A | 5/2003 |
| JP | 2010-069672 A | 4/2010 |

OTHER PUBLICATIONS

An Office Action; "Notification of Reasons for Refusal," issued by the Japanese Patent Office on Jun. 16, 2015, which corresponds to Japanese Patent Application No. 2011-202517 and is related to U.S. Appl. No. 13/234,921; with English language translation.

* cited by examiner

Primary Examiner — Huo Long Chen
(74) Attorney, Agent, or Firm — Studebaker & Brackett PC

(57) ABSTRACT

High speed print output is enabled, while eliminating the burden of rearranging printed matter in page order placed on users. A plurality of pages of print job data are divided into groups of a predetermined number of pages, and the divided plurality of pages are assigned to the print job data to generate a plurality of pieces of divided print job data. The pieces of divided print job data are arranged in reverse order of page numbers, expansion processes are administered on the pieces of divided print job data in the order that they are arranged to generate page data for each page. The page data are output for each piece of divided print job data in reverse order of page numbers and in the order that the expansion processes are administered, to a printing section.

11 Claims, 12 Drawing Sheets

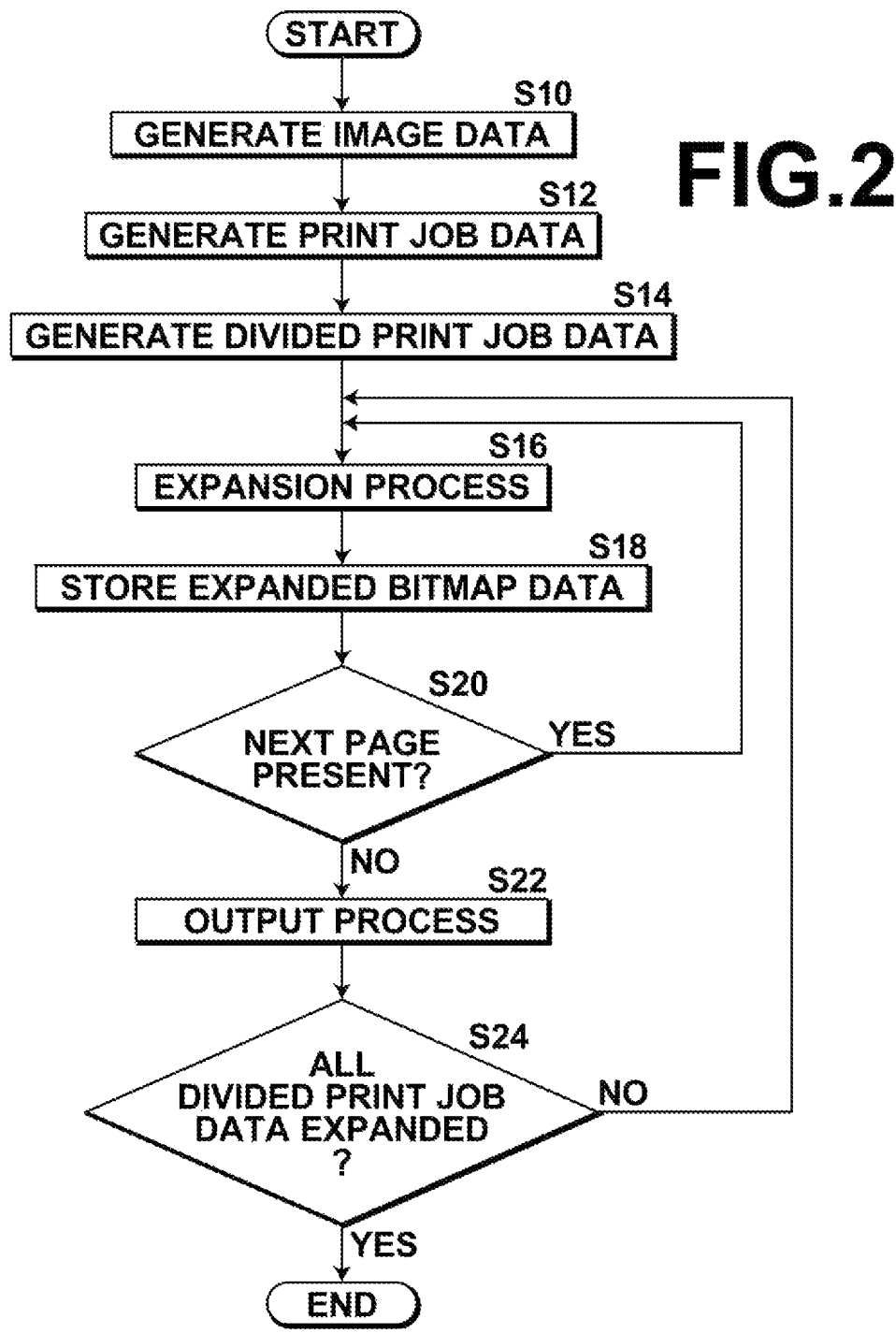

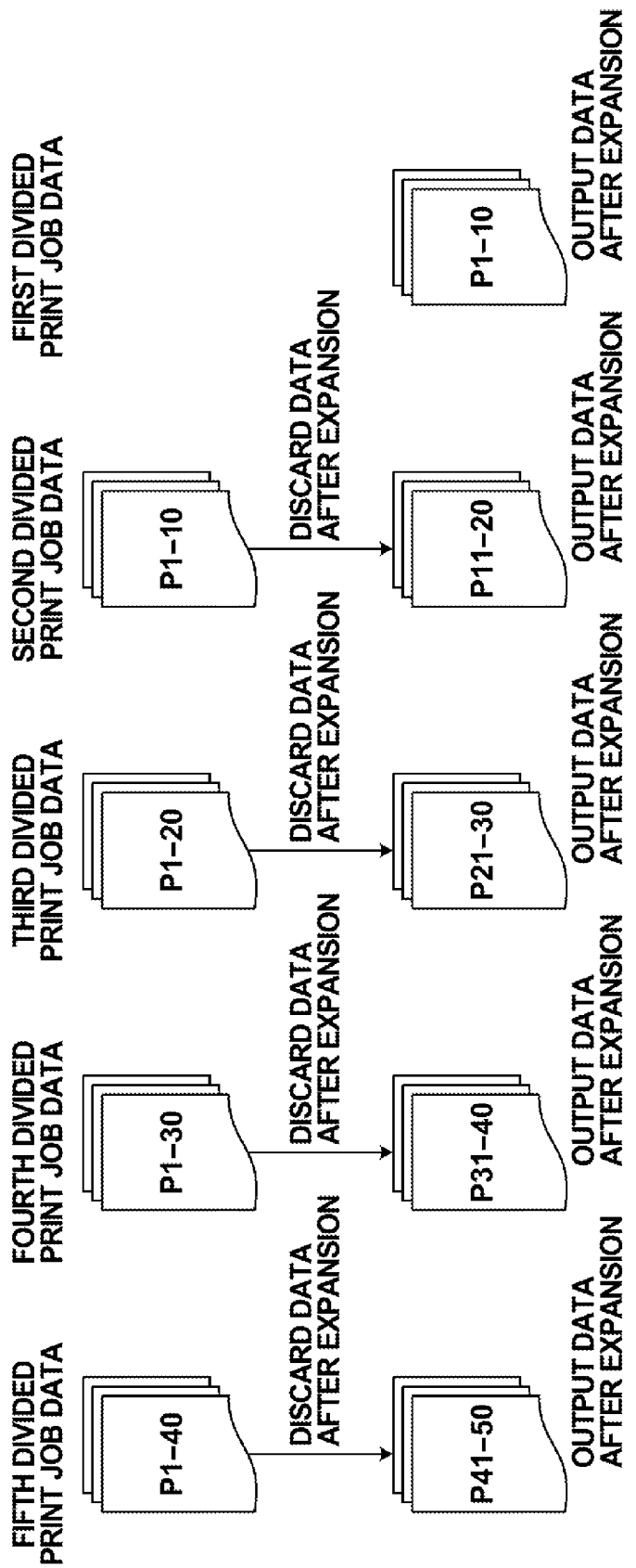

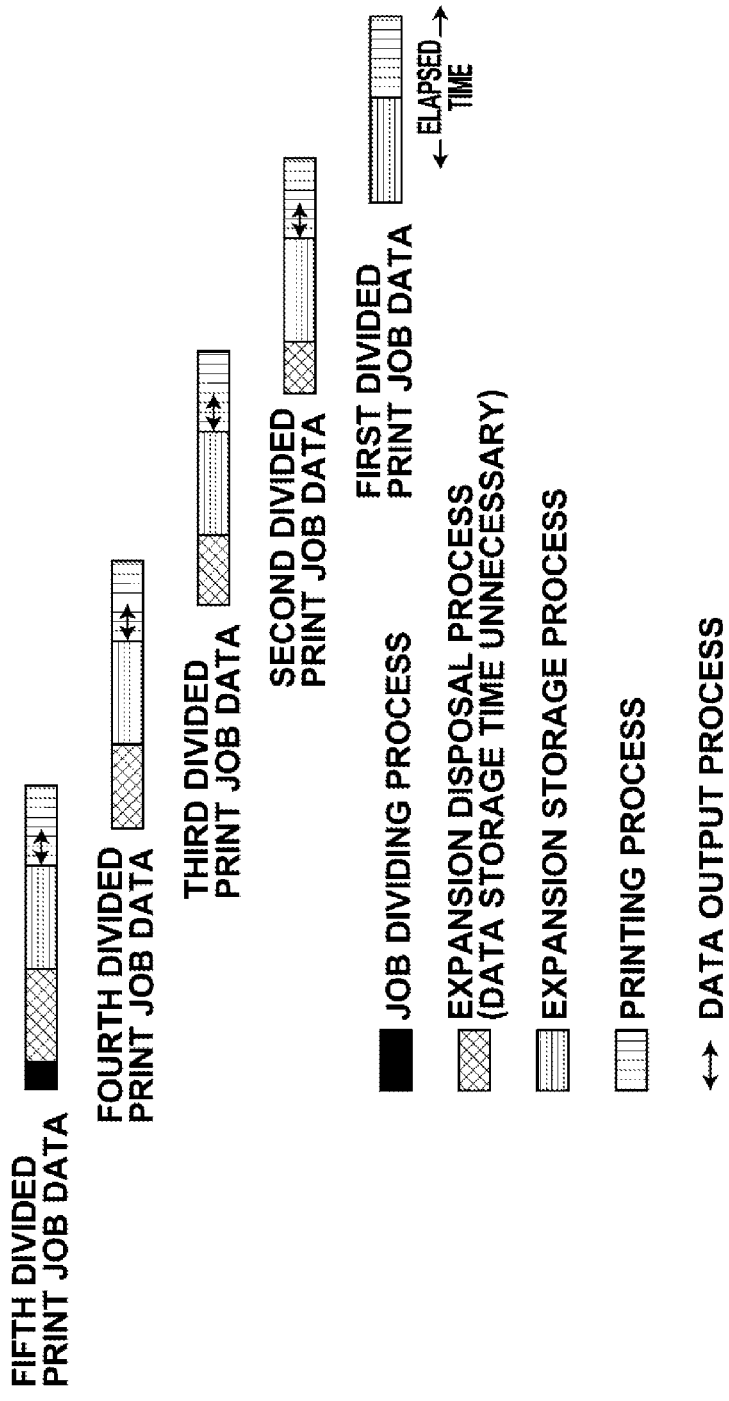

FIG.8

| MODEL INFORMATION | PRINT PROCESSING SPEED X |
|---|---|
| MODEL A | X1 |
| MODEL B | X2 |
| MODEL C | X3 |
| MODEL D | X4 |

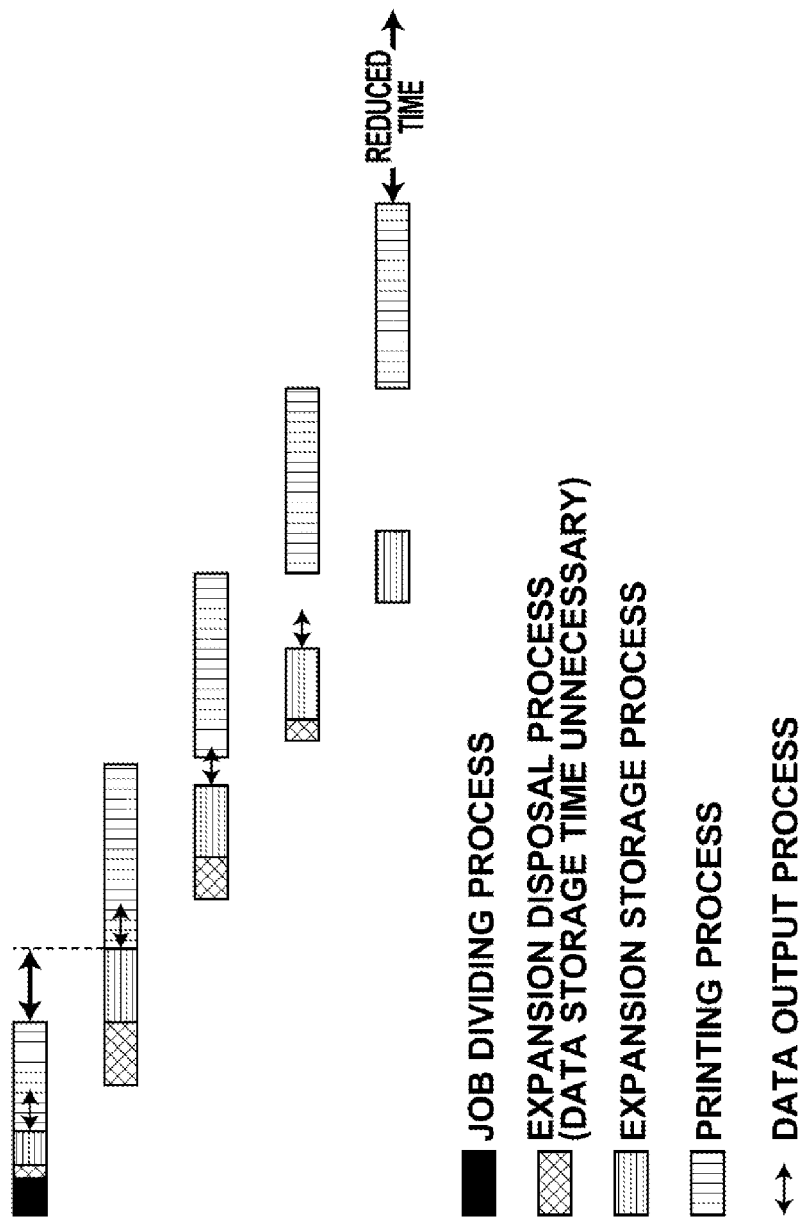
FIG.12A
FIG.12B

PRINT DATA GENERATING APPARATUS, PRINT DATA GENERATING PROGRAM, AND PRINTING APPARATUS

BACKGROUND OF THE INVENTION

Field of the Invention

The present invention is related to a print data generating apparatus, a print data generating program, and a printing apparatus. Particularly, the present invention is related to an apparatus, a program, and a printing apparatus that generate print job data employed in face up paper discharge printing.

Description of the Related Art

Conventionally, when printing of image data generated by editing applications such as notepad and MS Word™ is performed, the image data are converted into PDL (Page Description Language) by a printer driver of a computer, then output to a printing apparatus.

PDL is a language that describes output images to printing apparatuses when printing text and images generated on a computer, to provide instructions to the printing apparatuses.

When printing text using printing apparatuses, it is necessary for data, such as data regarding positional information of letters and drawings, and data regarding fonts, to be converted into bit map data. PDL is the language that generates bit map images, and can describe the bit map images regardless of the type or resolution of the printing apparatuses.

Meanwhile, in ink jet printers, for example, ink jet heads are provided above printing sheets and a printing method in which ink is sprayed downward is commonly employed, in order to prevent contamination of portions of the printer by ink being transferred thereon immediately after printing.

Printed sheets which are printed by such ink jet printers are discharged onto paper trays with the printed surfaces facing upward, that is, discharged in a so called face up manner.

When face up paper discharge is performed, because the printed surfaces face upward, in the case that print job data generated by a printer driver includes a plurality of pages, it is necessary to start printing from the last page of the print job data in order to arrange the printed matter in correct page order.

However, when print job data described in PDL are printed, there are cases in which correct bit map data for printing cannot be obtained if expansion is performed from an intermediate portion of the print job data by utilizing page headers or the like.

Accordingly, it is necessary to sequentially perform expansion from the start of the print job data in order to positively generate correct bit map data for printing.

However, during face up paper discharge, it is necessary to output the last page of the print job data first, as described above. Therefore, conventionally, print job data were sequentially expanded from the start thereof, expanded bit map data were sequentially stored within apparatuses, output was stalled until an expansion process for a last page was completed, then printers performed printing of expanded bit map data from the last page to the first page when the expansion process for the last page was completed.

However, in such a method, printing of the first page becomes possible only after the expansion process for the last page is completed. Therefore, an extremely long amount of time is required before initiation of printing of the first page, and there is a drawback that processing times become long.

In addition, even if the processing capability of a processing apparatus that performs expansion processes is sufficiently greater than the physical printing speed of a printing apparatus, the standby time for the expansion processes will become longer as the number of pages of print job data to be processed increases. For example, in the case that the processing capability of a processing apparatus is 1,000 ppm (pages per minute) and the printing speed of a printing apparatus is 50 ppm, extraneous standby time for expansion processes will occur in the case that print job data have 20 or more pages.

Therefore, Japanese Unexamined Patent Publication No. H11(1999)-110171 proposes a method in which print job data are divided into a plurality of blocks, and processing is performed in reverse page order within each of the blocks.

In the method disclosed in Japanese Unexamined Patent Publication No. H11 (1999)-110171, standby time until a first page is printed is shortened because the print job data are divided into blocks. However, because printing is sequentially performed from blocks having smaller page numbers, in the case that a printing apparatus is equipped with only one paper tray, for example, blocks having smaller page numbers will be discharged first, then blocks having larger page numbers will be discharged on the earlier blocks. Therefore, although page orders will be correct in units of blocks, the page order will be incorrect for the printed matter as a whole.

Even if a printing apparatus is equipped with a plurality paper trays, and pages for each block are discharged onto each of the trays, users are still burdened with rearranging the printed matter discharged onto the trays after all sheets are discharged, for the printed matter as a whole to be in the correct page order.

SUMMARY OF THE INVENTION

The present invention has been developed in view of the foregoing circumstances. It is an object of the present invention to provide a print data generating apparatus, a print data generating program, and a printing apparatus that are capable of realizing high speed print output, while eliminating the burden of rearranging printed matter.

A print data generating apparatus of the present invention is characterized by comprising:

a print job data receiving section, for receiving print job data having a print data for a plurality of pages and which are recognizable by a printing section;

a divided print job data generating section, for dividing the plurality of pages into groups of a predetermined number of pages, and for assigning the divided plurality of pages to the print job data received by the print job data receiving section, to generate a plurality of pieces of divided print job data; and an expansion processing section, for arranging the pieces of divided print job data generated by the divided print job data generating section in reverse order of page numbers, for generating page data for each page by administering expansion processes on the pieces of divided print job data in the order that they are arranged, and for outputting the page data for each piece of divided print job data in reverse order of page numbers and in the order that the expansion processes are administered, to the printing section.

The print data generating apparatus of the present invention may adopt a configuration wherein:

the expansion processing section discards page data for pages other than pages assigned to each piece of divided print job data.

The expansion processing section may administer a first expansion process to pages assigned to each piece of divided print job data and a second expansion process to pages other than the pages assigned to each piece of divided print job data, the first expansion process and the second expansion process being different; and the second expansion section may be that having a lighter processing load than that of the first expansion process.

The second expansion process may be that having a lower resolution than the first expansion process.

The first expansion process may be that which performs an imposition process, and the second expansion process may be that which does not perform an imposition process.

The divided print job data generating section may determine the number of groups into which the print job data is to be divided such that the expansion process for an n+1st (n is a integer having a value of 1 or greater) piece of divided print job data is completed during printing processes for the page data of an nth piece of divided print job data by the printing section.

The divided print job data generating section may determine the number of groups into which the print job data is to be divided such that a sum of an amount of time required for an output process for the page data of the nth piece of divided print job data and an amount of time required for the expansion process for the n+1st piece of divided print job data is less than the amount of time required for the printing process of the nth piece of divided print job data.

The expansion processing section may initiate the expansion process for an n+1st divided print job data at a point in time when the expansion process and the output process of the page data of an nth (n is an integer having a value of 1 or greater) piece of divided print job data are complete.

The divided print job data generating section may determine the greatest value of m that satisfies the following inequality (1) as the number of groups into which the print job data is to be divided.

$$Na/mX-(Na/mt+\{Na(m-2)\}/mr+Na/mR)>0 \quad (1)$$

wherein Na is the total number of pages of the print job data; r is the speed of the expansion process for pages other than the pages assigned to the piece of divided print job data; R is the speed of the expansion process for pages assigned to the piece of divided print job data; t is the speed of the output process for the page data of the piece of divided print job data; and X is the speed of the printing process of the printing section.

The print data generating apparatus of the present invention may further comprise:

a preflight processing section, for obtaining at least one of: the total number of pages of the print job data Na; the speed of the expansion process for pages other than the pages assigned to the piece of divided print job data r; the speed of the expansion process for pages assigned to the piece of divided print job data R; and the speed of the output process for the page data of the piece of divided print job data t, by analyzing the contents of the print job data.

The print data generating apparatus of the present invention may further comprise:

an input section, capable of inputting settings for at least one of: the total number of pages of the print job data Na; the speed of the expansion process for pages other than the pages assigned to the piece of divided print job data r; the speed of the expansion process for pages assigned to the piece of divided print job data R; and the speed of the output process for the page data of the piece of divided print job data t.

The divided print job data generating section may have a table in which a plurality of types of printing sections and data regarding the speeds of printing processes corresponding to each type of printing section are correlated; and the data regarding the speed of the printing process may be obtained by obtaining the type of the printing section and referring to the table.

The divided print job data generating section may obtain data regarding the speed of the printing process, which are output from the printing section.

The print data generating apparatus of the present invention may further comprise:

an imposition processing section, for performing imposition processes based on the page data. In this case, the divided print job data generating section may:

obtain the number of impositions when the imposition processes are to be performed, judges whether a division page number candidate, obtained by dividing the total number of pages of the print job data by the number of groups, is divisible by the number of impositions;

designate division page number candidate as a division page number and performs the division of the division print job data using the determined number of groups in the case that the division page number candidate is divisible by the number of impositions; and designate the smallest multiple of the number of impositions that exceeds the division page number candidate as the division page number, and performs the division using a number of groups based on the division page number in the case that the division page number candidate is not divisible by the number of impositions.

The print data generating apparatus of the present invention may further comprise:

an imposition processing section, for performing imposition processes based on the page data. In this case, the divided print job data generating section may:

obtain the number of impositions when the imposition processes are to be performed, obtains a preset reference division page number which is greater than the number of impositions;

judge whether a first division page number candidate, obtained by dividing the total number of pages of the print job data by the number of groups, is divisible by the number of impositions;

designate the first division page number candidate as a division page number as a second division page number candidate in the case that the first division page number candidate is divisible by the number of impositions;

designate the smallest multiple of the number of impositions that exceeds the first division page number candidate as a second division page number candidate in the case that the first division page number candidate is not divisible by the number of impositions;

judge whether the second division page number candidate is divisible by the reference division page number;

designate the second division page number candidate as a third division page number candidate in the case that the second division page number candidate is divisible by the reference division page number;

designate the smallest value which is a common multiple of the number of impositions and the reference division page number that exceeds the second division page number candidate as a third division page number candidate in the case that the second division page number candidate is not divisible by the reference division page number;

perform the division using a division page number and a number of groups based on the third division page number candidate in the case that the difference in processing time between a case that the second division page number candidate is designated as a division page number and the division is performed using a number of groups based on the division page number and a case that the third division page number candidate is designated as a division page number and the division is performed using a number of groups based on the division page number is less than or equal to a preset allowable amount of increase in processing time; and perform the division using a division page number and a number of groups based on the second division page number candidate in the case that the difference is greater than the allowable amount of increase in processing time.

The print data generating apparatus of the present invention may further comprise:

an imposition processing section, for performing imposition processes based on the page data. In this case, the divided print job data generating section may:

obtain the number of impositions when the imposition processes are to be performed as a first reference division page number, and one or k (k is an integer having a value from 2 to x) reference division page numbers greater than the first reference division page number;

judge whether a first division page number candidate, obtained by dividing the total number of pages in the print job data divided by the number of groups, is divisible by the first reference division page number;

designate the first division page number candidate as a second division page number candidate in the case that the first division page number candidate is divisible by the first reference division page number;

designate the smallest multiple of the first reference division page number that exceeds the first division page number candidate as a second division page number candidate in the case that the first division number candidate is not divisible by the first reference division number;

judge whether a kth division page number candidate is divisible by a kth reference division page number;

designate the kth division page number candidate as a k+1st division page number candidate in the case that the kth division number candidate is divisible by the kth reference division page number;

sequentially judge whether the difference in processing time for the print job data between a case in which the smallest value which is a common multiple of the first through kth reference division page number that exceeds the kth division page number candidate is designated as the k+1st division page number candidate, the second division page number candidate is designated as the division page number, and the division is performed using a number of groups based on the division page number, and a case in which the k+1st division page number candidate is designated as the division page number, and the division is performed using a number of groups based on the division page number, exceeds a preset allowable amount of increase in processing time, while increasing the value of k from 2 in the case that the kth division number candidate is not divisible by the kth reference division page number;

perform the division based on a division page number and a number of groups based on the kth division page number candidate at the point in time at which the difference exceeds the allowable amount of increase in processing time in the case that the difference exceeds the allowable amount of increase in processing time; and perform the division based on a division page number and a number of groups based on an x+1st division page number candidate in the case that the difference is less than or equal to the allowable amount of increase in processing time when k reaches the value x.

A print data generating program of the present invention causes a computer to function as:

a print job data receiving section, for receiving print job data having a print data for a plurality of pages and which are recognizable by a printing section;

a divided print job data generating section, for dividing the plurality of pages into groups of a predetermined number of pages, and for assigning the divided plurality of pages to the print job data received by the print job data receiving section, to generate a plurality of pieces of divided print job data; and an expansion processing section, for arranging the pieces of divided print job data generated by the divided print job data generating section in reverse order of page numbers, for generating page data for each page by administering expansion processes on the pieces of divided print job data in the order that they are arranged, and for outputting the page data for each piece of divided print job data in reverse order of page numbers and in the order that the expansion processes are administered, to the printing section.

A printing apparatus of the present invention is characterized by comprising:

the print data generating apparatus of the present invention; and a printing section that performs printing processes based on page data output from the print data generating apparatus.

The print data generating apparatus, the print data generating program, and the printing apparatus of the present invention divide the plurality of pages of the print job data into groups of a predetermined number of pages, and assign the divided plurality of pages to the print job data received by the print job data receiving section, to generate a plurality of pieces of divided print job data. The pieces of divided print job data are arranged in reverse order of page numbers, and expansion processes are administered on the pieces of divided print job data in the order that they are arranged to generate page data for each page. The page data are output for each piece of divided print job data in reverse order of page numbers and in the order that the expansion processes are administered, to the printing section. Therefore, standby time caused by the expansion process can be shortened, to realize high speed printing output, and at the same time, printed matter in correct page order can be obtained without a user rearranging the printed matter.

BRIEF DESCRIPTION OF THE DRAWINGS

FIG. 2 is a flow chart for explaining the operation of the printer system that employs the first embodiment of a print data generating apparatus of the present invention.

FIG. 3 is a diagram that illustrates pieces of divided print job data.

FIG. 5A is an alternate timing chart that illustrates the processes administered for each piece of divided print job data.

FIG. 5B is a timing chart that illustrates the processes administered by a conventional printer system.

FIG. 8 is a diagram that illustrates an example of a table in which models of printing engines and data regarding their print processing speeds are correlated.

FIG. 12 is an alternate timing chart that illustrates the processes administered for each piece of divided print job data.

DESCRIPTION OF THE PREFERRED EMBODIMENTS

Figure 1:
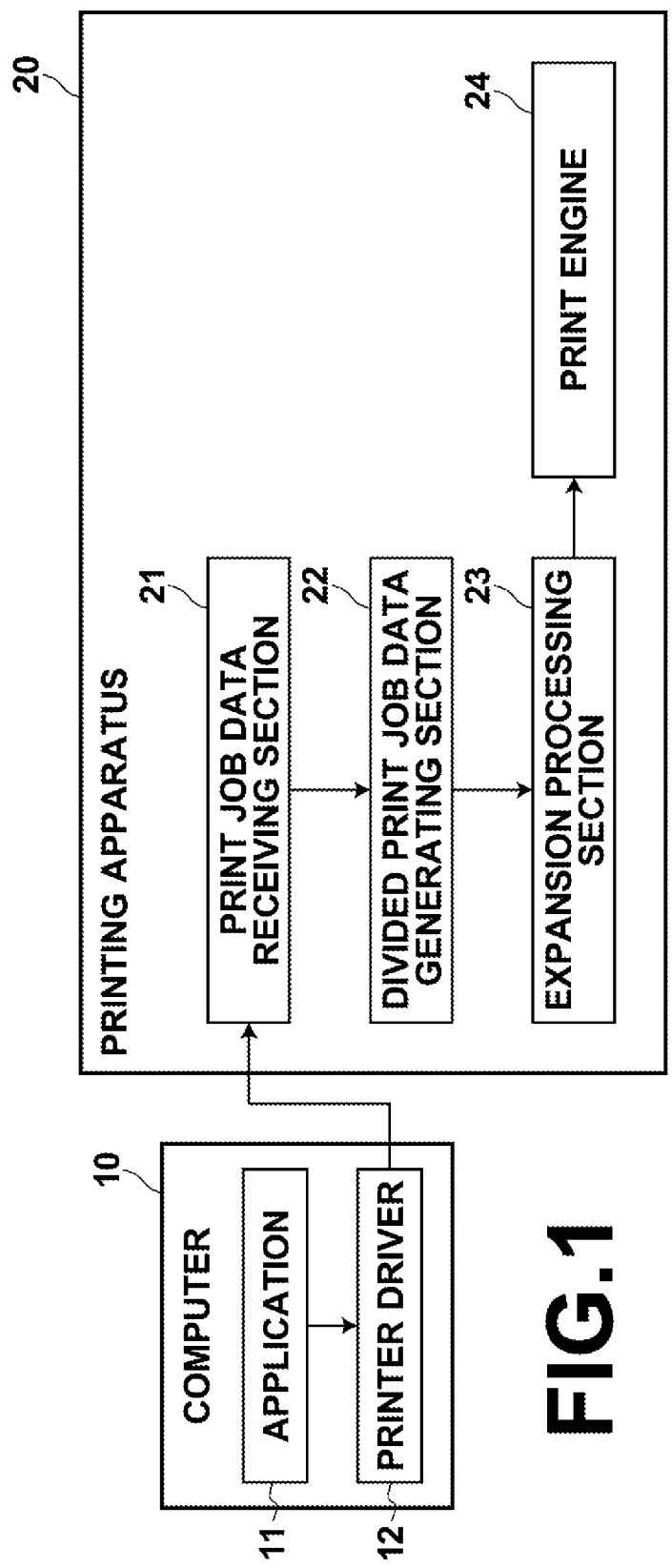
FIG. 1 is a block diagram that illustrates the schematic structure of a printer system that employs a first embodiment of a print data generating apparatus of the present invention.

Hereinafter, a first embodiment of the print data generating apparatus and the print data generating program of the present invention will be described in detail with reference to the attached drawings. FIG. 1 is a block diagram that illustrates the schematic structure of a printer system of the first embodiment.

As illustrated in FIG. 1, the printer system of the first embodiment is equipped with: a computer 10, and a printing apparatus 20 connected to the computer 10 via a network, such as a LAN and a wireless LAN.

As illustrated in FIG. 1, the computer 10 is equipped with an application 11 and a printer driver 12. Note that the application 11 and the printer driver 12 are constituted by programs installed in the computer 10.

The application 11 is that which can edit image data that represent text and images, such as notepad and MS Word™. Image data edited by the application 11 are output to the printer driver 12.

The printer driver 12 has a user interface for receiving user input regarding various printing conditions and output formats, such as number of pages, number of copies, double sided printing, and N up printing. The printer driver generates print job data which are recognizable by the printing apparatus 20 according to the printing conditions and output formats, and outputs the print job data. The printer driver 12 of the first embodiment generates PDL (Page Description Language) data as the print job data. Note that the printing conditions, output formats, and the like are input via input means provided on the computer 10, such as a keyboard and a mouse.

As illustrated in FIG. 1, the printing apparatus 20 is equipped with a print job data receiving section 21, a divided print job data generating section 22, an expansion processing section 23, and a printing engine 24.

The print job data receiving section 21 receives print job data having a plurality of pages output from the printer driver 12 of the computer 10.

The divided print job data generating section 22 divides the total pages of the print job data into groups of a predetermined number of pages, and assigns the pluralities of pages to the print job data to generate a plurality of pieces of divided print job data. Note that the divided print job data generating section 22 is equipped with a storage section, such as a memory for temporarily storing the input print job data, and for storing the pieces of divided print job data generated based on the print job data. The specific method by which the pieces of divided print job data are generated will be described later.

The expansion processing section 23 arranges the pieces of divided print job data output from the divided print job data generating section 22 in reverse order of page numbers, generates page data for each page by administering expansion processes on the pieces of divided print job data in the order that they are arranged, and outputs the page data for each piece of divided print job data in reverse order of page numbers and in the order that the expansion processes are administered, to the printing engine 24. Note that the expansion processing section 23 is equipped with a storage section, such as a memory for temporarily storing the generated page data. The specifics of the expansion processes will be described later.

The printing engine 24 administers printing processes onto printing sheets based on the page data output from the expansion processing section 23. A stencil printer, an ink jet printer, or a laser printer may be employed, for example.

Next, the operation of the printer system of the first embodiment will be described with reference to the flow chart of FIG. 2.

First, the application 11 is executed, and the application 11 is employed to edit text, illustrations, photographic images, etc., to generate image data (S10).

When a print command is selected in the application 11, the user interface of the printer driver 12 is booted up, and a printing condition reception screen for receiving input of various printing conditions and output formats is displayed. A user sets various printing conditions and output formats in the printing condition reception screen using the input means. Thereafter, if a print command is selected, the printer driver 12 generates print job data based on the printing conditions, the output format, and the image data (S12).

The print job data generated by the printer driver 12 are output to the printing apparatus 20, and received by the print job data receiving section 21. Next, the print job data received by the print job data receiving section 21 are output to the divided print job data generating section 22, and the divided print job data generating section 22 generates pieces of divided print job data based on the input print job data (S14).

In the first embodiment, print job data for 50 pages of print data are received by the print job data receiving section 21. A case in which a plurality of pieces of divided print job data are generated based on the 50 pages of print job data will be described.

Specifically, the divided print job data generating section 22 divides the 50 pages into 5 groups of 10 pages each, and generates 5 pieces of divided print job data, by assigning each of the 5 groups of pages to print job data. Note that in the first embodiment, all of the pages are divided into 5 groups of pages. However, the number of divisions is not limited to 5, and other division numbers may be employed. It is desirable for a division number that satisfies predetermined conditions to be set to obtain the advantageous effect of reducing print processing time. A method by which the division number is set in this manner will be described later with reference to a second embodiment of the present invention. In the first embodiment, it is assumed that a division number that satisfies predetermined conditions has been obtained and set in advance.

FIG. 3 illustrates five pieces of divided print job data generated as described above. As illustrated in FIG. 3, from among the 50 pages, the first through tenth pages are assigned to the print job data to generate a first piece of divided print job data, the eleventh through twentieth pages are assigned to the print job data to generate a second piece of divided print job data, the twenty first through thirtieth pages are assigned to the print job data to generate a third piece of divided print job data, the thirty first through fortieth pages are assigned to the print job data to generate a fourth piece of divided print job data, and the forty first through fiftieth pages are assigned to the print job data to generate a fifth piece of divided print job data.

Figures 4A, 4B:
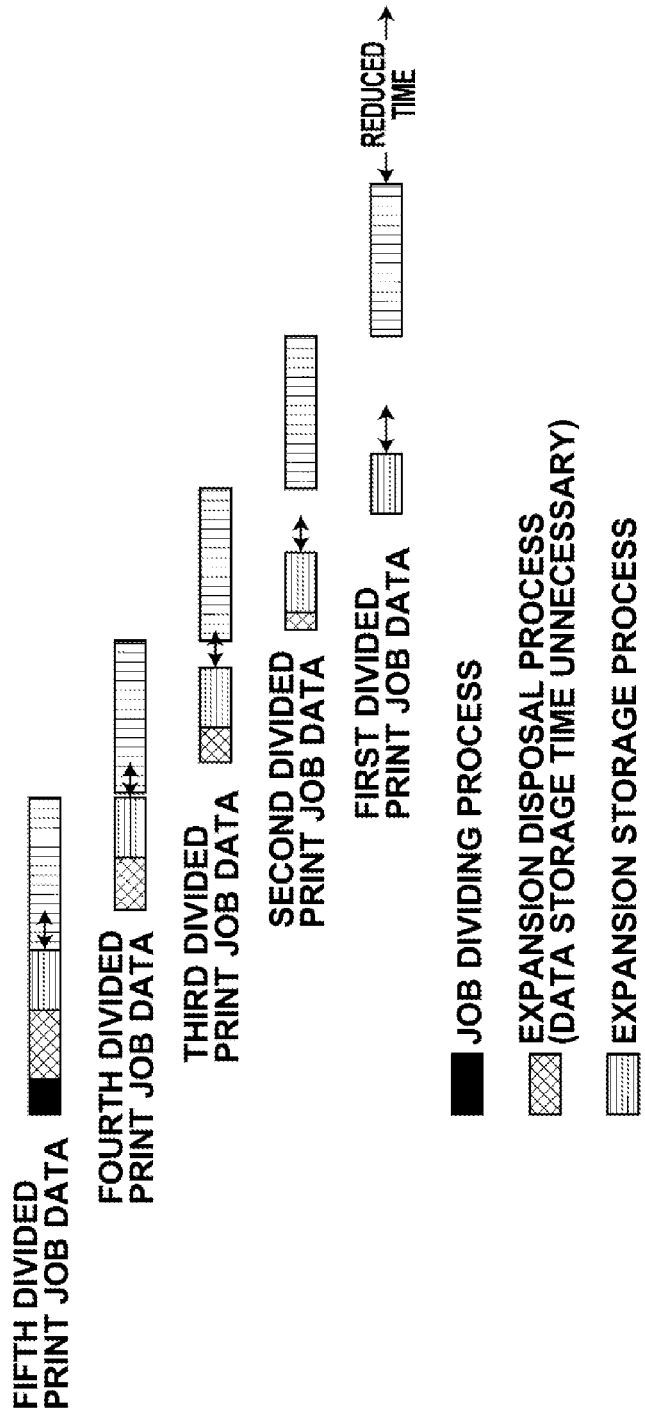
FIG. 4A is a timing chart that illustrates the processes administered for each piece of divided print job data.
FIG. 4B is a timing chart that illustrates the processes administered by a conventional printer system.

Next, the divided print job data generating section 22 outputs the first through fifth pieces of divided print job data to the expansion processing section 23. The expansion processing section 23 administers expansion processes on the input pieces of divided print job data (S16). FIG. 4A illustrates a timing chart of the processes administered to the first through fifth pieces of divided print job data.

Specifically, the expansion processing section 23 first arranges the first through fifth pieces of divided print job data input thereto in reverse page order. That is, the expansion processing section 23 arranges the pieces of divided print job data in order starting from the fifth piece of divided print job data, then the fourth piece of divided print job data, then the third piece of divided print job data, then the second piece of divided print job data, then the first piece of divided print job data.

Next, as illustrated in FIG. 4A, expansion processes are administered on the pieces of divided print job data in the order described above in which they are arranged, to generate bit map data for each page as page data. The bit map data for each piece of divided print job data are output to the printing engine 24 in the order that the expansion processes are administered and in reverse page order.

That is, first, expansion processes are performed with respect to the fifth piece of divided print job data, to which pages 41 through 50 are assigned. Specifically, as illustrated in FIG. 3, expansion processes are administered from page 1 to page 40, and bit map data for these pages are discarded without being stored. Then, expansion processes are administered onto page 41 through page 50 in page order, to generate bit map data, which are stored in the storage section, such as the memory (S18, S20). Note that in the following description, the process in which bit map data are discarded after expansion processes is referred to as an expansion disposal process, and the process in which bit map data are stored after expansion processes is referred to as an expansion storage process.

Here, the expansion processing section 23 performs expansion processes such that the resolution during the expansion disposal processes administered onto pages 1 through 40 is lower than that during the expansion storage processes administered onto pages 41 through 50. That is, the expansion processing section 23 performs expansion processes such that the expansion disposal process administered on the pages other than the pages assigned to the piece of divided print job data are of lower resolutions than that of the expansion storage process administered on the pages assigned to the piece of divided print job data.

In addition, in the case that printing conditions that require imposition processes, such as double sided printing or N up printing, are set as printing conditions for the print job data, the expansion processing section 23 does not perform an imposition process when performing expansion disposal processes on the pages other than the pages assigned to the piece of divided print job data, and performs the imposition process when performing expansion storage processes on the pages assigned to the piece of divided print job data. Note that the imposition process in the first embodiment refers to processes for allocating data for two pages to the front and back surfaces of a single printing sheet in the case of double sided printing, or allocating data for a plurality of pages to a single surface of a printing sheet in the case of N up printing. In order to perform this process, it is necessary to calculate the allocated size of each page after imposition, calculate the allocation direction and allocated position for each page, perform expansion processes on each page such that the page will be expanded at the allocated size and the allocation direction after imposition, and to arrange the expansion processed page data to the allocated positions after imposition on a page (an image frame within the memory), which is a highly complex process.

In addition, in the case that a text smoothing process is set as a printing condition for the print job data, the expansion processing section 23 does not perform a text smoothing process when performing expansion disposal processes on the pages other than the pages assigned to the piece of divided print job data, and performs the text smoothing process when performing expansion storage processes on the pages assigned to the piece of divided print job data. Note that the text smoothing process is a process to impart a smooth appearance to the outlines of text and the like when expanding page data to multivalent data. This process generates high resolution data, then reduces the resolution of the data by averaging the densities of adjacent pixels within the data, to reduce density differences among adjacent pixels in data of a resolution which is ultimately generated. Accordingly, this process requires the step of generating the high resolution data, and the steps of reducing resolution thereafter, which is a highly complex process.

In essence, the expansion processing section 23 administers processes such that the expansion disposal processes have a lighter processing burden than the expansion storage processes. The same applies to the expansion processes for the fourth through first pieces of divided print job data to be described later.

When the expansion process for the 50th page is complete, the expansion processing section 23 outputs bit map data to the printing engine 24 in reverse page order starting from page 50, which is the last page, to page 41 (S22).

The printing engine 24 initiates a printing process for the 50th page based on the bit map data thereof when the bit map of the 50th page is received. Thereafter, printing processes are sequentially performed for received pages. As illustrated in FIG. 4A, the bit map data output process performed by the expansion processing section 23 (the arrows of FIG. 4A) and the printing process performed by the printing engine (the vertically hatched portions of FIG. 4A) are performed in parallel. Printed sheets, on which the printing process has been administered, are discharged from the printing engine 24 sequentially in reverse page order from the 50th page. These sheets are discharged such that the printed surfaces thereof face upward.

Then, as illustrated in FIG. 4A, expansion processes for the fourth piece of divided print job data are initiated at a point in time at which the output processes for the bit map data of the fifth piece of divided print job data are complete (S24, S16). Note that the printer system of the first embodiment is configured such that output processes for bit map data and the expansion processes cannot be performed in parallel due to hardware restrictions. However, the present invention is not limited to such a configuration, and these processes may be performed in parallel. In this case, output processes for the bit map data of the fifth piece of divided print job data and the expansion disposal processes for the fourth piece of divided print job data may be performed in parallel from a point in time at which the expansion storage processes for the fifth piece of divided print job data are completed.

Expansion processes for the fourth piece of divided print job data are performed in parallel with printing processes for the fifth piece of divided print job data. Specifically, as illustrated in FIG. 3, first, expansion disposal processes are performed for page 1 through page 30. Bit map data of these pages are discarded without being stored. Expansion storage processes are administered to page 31 through page 40 in page order, to generate bit map data, which are stored in the storage section such as the memory (S18, S20). When the expansion process for page 40 is complete, the expansion processing section 23 outputs the bit map data thereof to the printing engine 24 in reverse page order, from page 40 to page 31 (S22).

The printing engine 24 initiates a printing process for the 40th page based on the bit map data thereof when the bit map of the 40th page is received, and sequentially performs printing processes for pages received thereafter. The bit map data output process performed by the expansion processing section 23 and the printing process performed by the printing engine are performed in parallel.

Printed sheets, on which the printing process has been administered, are discharged from the printing engine 24 sequentially in reverse page order from the 40th page. These sheets are discharged such that the printed surfaces thereof face upward.

Then, as illustrated in FIG. 4A, expansion processes for the third piece of divided print job data are performed in parallel with the printing process for the fourth piece of divided print job data. Specifically, as illustrated in FIG. 3, first, expansion disposal processes are performed for page 1 through page 20. Bit map data of these pages are discarded without being stored. Expansion storage processes are administered to page 21 through page 30 in page order, to generate bit map data, which are stored in the storage section such as the memory (S18, S20). When the expansion process for page 30 is complete, the expansion processing section 23 outputs the bit map data thereof to the printing engine 24 in reverse page order, from page 30 to page 21 (S22).

The printing engine 24 initiates a printing process for the 30th page based on the bit map data thereof when the bit map of the 30th page is received, and sequentially performs printing processes for pages received thereafter. As illustrated in FIG. 4A, the printing processes for the fourth piece of divided print job data are not completed at the point in time at which the printing engine 24 receives the bit map data for page 30. Therefore, the printing engine 24 initiates printing processes for page 30 after the printing processes for the fourth piece of divided print job data are complete.

Printed sheets, on which the printing processes for pages 30 through 21 have been administered, are discharged from the printing engine 24 sequentially in reverse page order from the 30th page. These sheets are discharged such that the printed surfaces thereof face upward.

Then, as illustrated in FIG. 4A, expansion processes for the second piece of divided print job data are performed in parallel with the printing process for the third piece of divided print job data. Specifically, as illustrated in FIG. 3, first, expansion disposal processes are performed for page 1 through page 10. Bit map data of these pages are discarded without being stored. Expansion storage processes are administered to page 11 through page 20 in page order, to generate bit map data, which are stored in the storage section such as the memory (S18, S20). When the expansion process for page 20 is complete, the expansion processing section 23 outputs the bit map data thereof to the printing engine 24 in reverse page order, from page 20 to page 11 (S22).

The printing engine 24 initiates a printing process for the 20th page based on the bit map data thereof when the bit map of the 20th page is received, and sequentially performs printing processes for pages received thereafter. As illustrated in FIG. 4A, the printing processes for the third piece of divided print job data are not completed at the point in time at which the printing engine 24 receives the bit map data for page 20. Therefore, the printing engine 24 initiates printing processes for page 20 after the printing processes for the third piece of divided print job data are complete.

Printed sheets, on which the printing processes for pages 20 through 11 have been administered, are discharged from the printing engine 24 sequentially in reverse page order from the 20th page. These sheets are discharged such that the printed surfaces thereof face upward.

Then, as illustrated in FIG. 4A, expansion processes for the first piece of divided print job data are performed in parallel with the printing process for the second piece of divided print job data. Specifically, as illustrated in FIG. 3, expansion storage processes are administered to page 1 through page 10 in page order, to generate bit map data, which are stored in the storage section such as the memory (S18, S20). When the expansion process for page 10 is complete, the expansion processing section 23 outputs the bit map data thereof to the printing engine 24 in reverse page order, from page 10 to page 1 (S22).

The printing engine 24 initiates a printing process for the 10th page based on the bit map data thereof when the bit map of the 10th page is received, and sequentially performs printing processes for pages received thereafter. As illustrated in FIG. 4A, the printing processes for the second piece of divided print job data are not completed at the point in time at which the printing engine 24 receives the bit map data for page 10. Therefore, the printing engine 24 initiates printing processes for page 10 after the printing processes for the second piece of divided print job data are complete.

Printed sheets, on which the printing processes for pages 10 through 1 have been administered, are discharged from the printing engine 24 sequentially in reverse page order from the 10th page. These sheets are discharged such that the printed surfaces thereof face upward.

Here, FIG. 4B illustrates a timing chart of processes performed by a conventional printer system, to compare the processing time of the printer system of the first embodiment against the processing time of the conventional printer system. In the conventional printer system, data output processes and printing processes are performed after expansion processes for the entire print job data are complete.

As illustrated in FIGS. 4A and 4B, the printer system of the first embodiment performs the expansion processes of subsequent pieces of divided print job data in parallel with the printing processes for a preceding piece of divided job data. Therefore, processing time can be shortened compared to those of conventional printer systems.

Here, as described above, the printer system of the first embodiment assigns a predetermined number of pages for each piece of divided print job data. However, during the expansion processes, it is necessary to perform the expansion disposal processes for the first page to the page number where the assignment starts.

Accordingly, there may be cases in which a sum of the overhead time required for the expansion processes from the first page up to the initial assigned page number and the time taken by the output processes for the pieces of divided print job data exceed the reduced amount of time indicated in FIG. 4A. In these cases, a process in which the print job data are divided into the first and fifth pieces of divided print job data as illustrated in FIG. 5A takes a longer amount of time than the processing time of a conventional print system illustrated in FIG. 5B.

Figure 6:
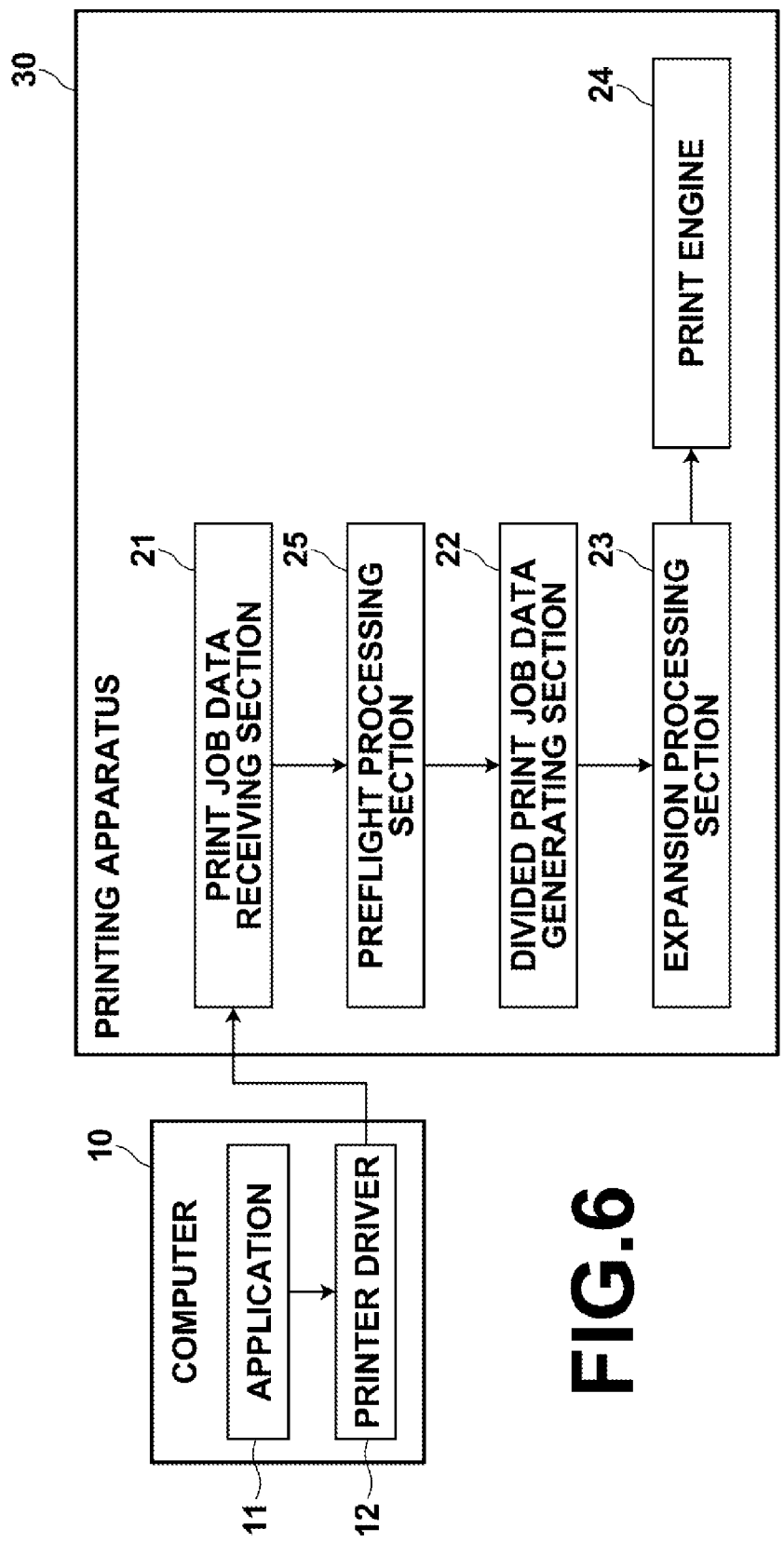
FIG. 6 is a block diagram that illustrates the schematic structure of a printer system that employs a second embodiment of a print data generating apparatus of the present invention.

A printer system that employs the second embodiment of the print data generating apparatus of the present invention, which is configured to prevent such problems from occurring, will be described. FIG. 6 is a block diagram that illustrates the schematic structure of the printer system that employs the second embodiment of a print data generating apparatus of the present invention.

The printer system of the second embodiment is the printer system of the first embodiment, further provided with a preflight processing section 25.

The preflight processing section 25 analyzes the contents of print job data received by the print job data receiving section 21, and calculates the number of pieces of divided print job data to be generated by the divided print job data generating section 22 based on the results of analysis.

Figure 7:
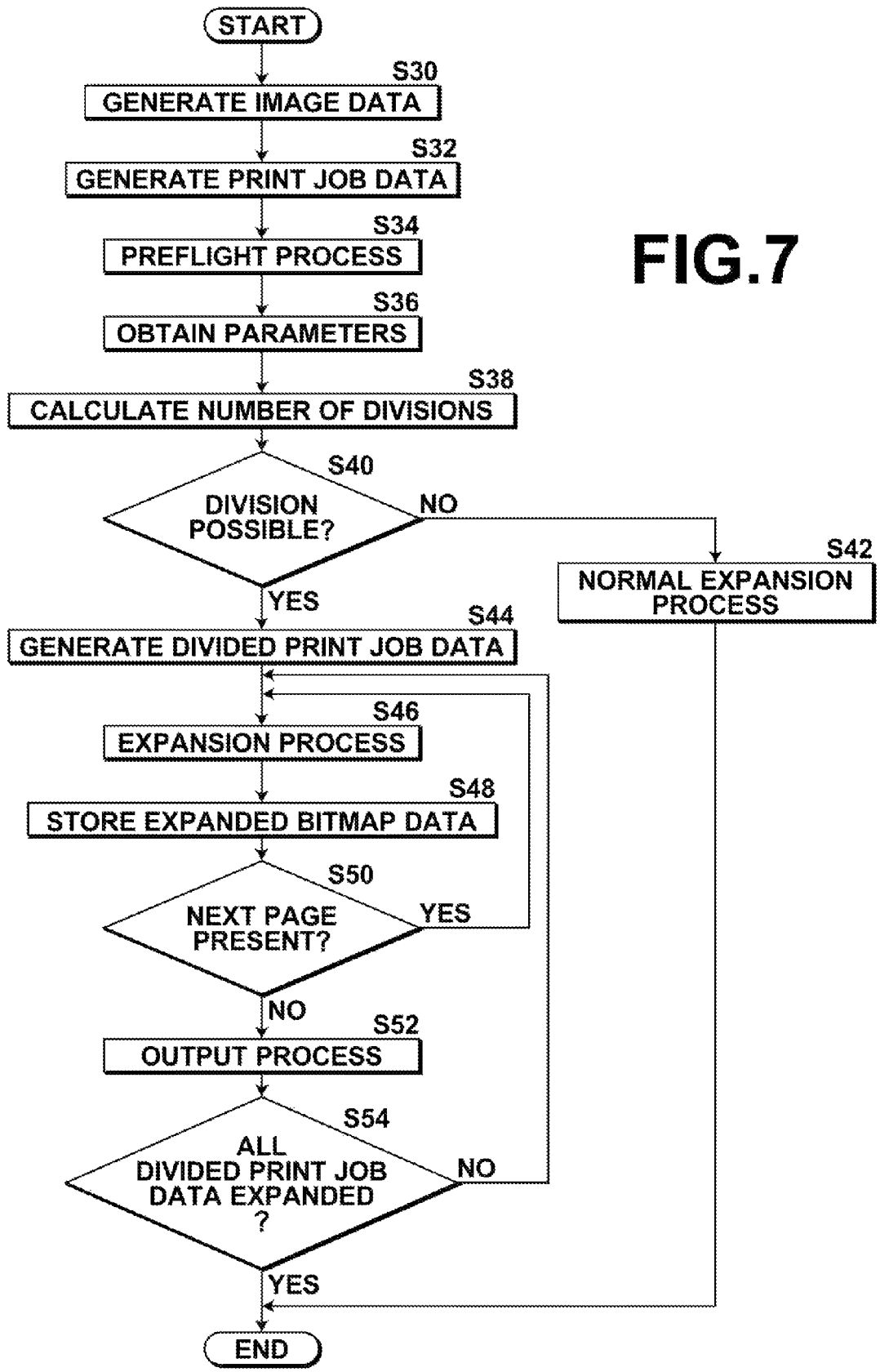
FIG. 7 is a flow chart for explaining the operation of the printer system that employs the second embodiment of a print data generating apparatus of the present invention.

The operation of the printer system of the second embodiment will be described with reference to the flow chart of FIG. 7.

Steps S30 through S32, in which image data are generated by the computer 10 and print job data are generated based on the image data, are the same as those described with respect to the first embodiment.

The print job data output from the computer 10 are received by the print job data receiving section 21 of a printing apparatus 30 are output to the preflight processing section 25.

The preflight processing section 25 analyzes the contents of the input print job data, and obtains parameters for determining the number of pieces of divided print job data to be generated, that is, a division number (S34, S36).

Specifically, the preflight processing section 25 obtains the total number of pages of the print job data Na; a job division processing speed s; an expansion disposal processing speed r; an expansion processing speed R; and a data output processing speed t, as the aforementioned parameters.

The preflight processing section 25 obtains the total number of pages of the print job data Na by reading out data regarding the total number of pages included in the print job data.

The job division processing speed s (pages/second) refers to a processing speed for the processes of temporarily storing the print job data in a storage section, reading out the stored print job data, generating pieces of divided print job data based on the print job data, and storing the pieces of divided print job data in the storage section, for example. The preflight processing section 25 calculates the job division processing speed s based on the size of the print job data and the input/output speed of the storage section. Note that the size of the print job data is obtained by analyzing the print job data, and the input/output speed of the storage section is assumed to be set in advance.

The expansion disposal processing speed r (pages/second) refers to the number of pages per second that the expansion disposal process can be administered on, and the expansion processing speed R (pages/second) refers to the number of pages per second that the expansion storage process can be administered on.

The preflight processing section 25 obtains the expansion disposal processing speed r and the expansion processing speed R by performing expansion disposal processes on a portion or all of the pages of the print job data at a low resolution, and by performing expansion storage processes on a portion or all of the pages of the print job data at a high resolution, and by measuring the amounts of time required to perform the expansion disposal processes and the expansion storage processes. Specifically, during the expansion disposal processes, a portion or the entirety of the print job data is read into the memory, the print job data are analyzed, expansion processes are performed in a state that has a lighter burden than a normal expansion process, such as at low resolution, until a portion of the data at which a "page break command" is recorded is reached, to generate image data corresponding to a single page on the memory, without storing the image data on a hard disk or the like. The above processes are repeated until a specified page is reached. During the expansion storage processes, a portion or the entirety of the print job data is read into the memory, the print job data are analyzed, normal expansion processes are performed until a portion of the data at which a "page break command" is recorded is reached, to generate image data corresponding to a single page on the memory, which is stored on a hard disk or the like. The above processes are repeated until the final page of the print job data.

Then, the numbers of processed pages are divided by the measured amounts of time (seconds) to calculate the expansion disposal processing speed r and the expansion processing speed R. Note that a table that indicates the correlative relationship between measured amounts of time and expansion disposal processing speeds r and a table that indicates the correlative relationships between measured amounts of time and expansion processing speeds R may be prepared in advance. In this case, the expansion disposal processing speed r and the expansion processing speed R may be obtained by referring to these tables.

The data output processing speed t (pages/second) is the processing speed at which the bit map data on which the expansion storage process has been administered are read out from the storage section and output to the printing engine 24. The preflight processing section 25 calculates the data output processing speed t based on the size of the print job data and the data transfer speed of the storage section. The print job data are analyzed to obtain the size of the print job data and the sizes of bit map data corresponding to the print job data. Then, the data output processing speed t is calculated based on the sizes of the bit map data and the data transfer speed. The relationships between sizes of the print job data and the sizes of bit map data are set in advanced, as is the data transfer speed of the storage section.

The above parameters obtained by the preflight processing section 25 are output to the divided print job data generating section 22, and the divided print job data generating section 22 calculates the number of pieces of the divided print job data based on the input parameters (S38).

Specifically, the divided print job data generating section 22 determines the number of groups into which the print job data is to be divided such that the expansion process for an n+1st (n is a integer having a value of 1 or greater) piece of divided print job data is completed during printing processes for the bit map data of an nth piece of divided print job data. Hereinafter, the specific calculation method will be considered.

First, in the second embodiment, the data output process and the expansion process cannot be performed in parallel. Therefore, in order for the expansion process for the n+1st (n is a integer having a value of 1 or greater) piece of divided print job data to be completed during printing processes for the bit map data of the nth piece of divided print job data, it is necessary for the sum of the output process time for the bit map data of the nth piece of divided print job data, the expansion disposal processing time and the expansion storage processing time for the n+1st piece of divided print job data to be less than or equal to the print processing time of the nth piece of divided print job data.

Here, with respect to the expansion disposal processing time for each piece of divided print job data, the number of pages for which the expansion disposal process is administered is greater for pieces of divided print job data on which expansion processes are performed earlier. Therefore, the expansion disposal processing time will become longer for pieces of divided print job data that undergo expansion processes earlier. With respect to the expansion storage processing time, it will be same for all pieces of divided print job data, because the number of pages that undergo the expansion storage process is the same in all pieces of divided print job data. Likewise, the output processing time for the bit map data and the print processing time by the printing engine 24 are the same for all pieces of divided print job data, because the numbers of pages therein are the same.

That is, the only variable amount of time among the pieces of divided print job data is the expansion disposal processing time, and the expansion disposal processing time is longer for pieces of divided print job data which are processed earlier. Therefore, in order for the expansion process for the n+1st (n is a integer having a value of 1 or greater) piece of divided print job data to be completed during printing processes for the bit map data of the nth piece of divided print job data, it is necessary for the sum of the output process time for the bit map data of the first piece of divided print job data to be processed, the expansion disposal processing time and the expansion storage processing time for the second piece of divided print job data to be processed to be less than or equal to the print processing time of the first piece of divided print job data by the printing engine 24. If this condition is satisfied, the same conditions will be satisfied for the other pieces of divided print job data as well. Note that here, the first and second pieces of divided print job data to be processed are different from the first, second, . . . pieces of print job data illustrated in FIG. 3. The first piece of divided print job data to be processed corresponds to the fifth piece of divided print job data illustrated in FIG. 3, and the second piece of divided print job data to be processed corresponds to the fourth piece of divided print job data illustrated in FIG. 3.

If the division number of the pieces of divided print job data is designated as m, the output processing time for the bit map data of the first piece of divided print job data to be processed will be expressed as Na/mt, the expansion disposal processing time of the second piece of divided print job data to be processed will be expressed as $\{Na(m-2)\}/mr$, and the expansion storage processing time will be expressed as Na/mR. In addition, if the print processing speed of the printing engine 24 is designated as X (pages/second), the print processing time of the first piece of divided print job data to be processed will be expressed as Na/mX. Note that the print processing speed X is assumed to be set in advance in the second embodiment.

Accordingly, the above condition will be satisfied by the following inequality (1) being satisfied:

$$Na/mX - (Na/mt + \{Na(m-2)\}/mr + Na/mR) > 0 \quad (1)$$

Meanwhile, in order to shorten the entire processing time, it is desirable for the sum of the job division processing time, the expansion disposal processing time of the first piece of divided print job data to be processed and the expansion storage processing time of the first piece of divided print job data to be processed to be smaller, as can be understood from FIG. 4A. The job division processing time is represented as Nam/s, and the expansion disposal time of the first piece of divided print job data to be processed is represented as $\{Na(m-1)\}/mr$, and the exposure storage processing time is represented as Na/mR. Therefore, the sum of these times can be represented by the following formula (2).

$$Nam/s + \{Na(m-1)\}/mr + Na/mR \quad (2)$$

If the following inequality (3) is satisfied in order for the sum obtained by Formula (2) to become smaller, it can be understood that larger values of m are more favorable.

$$Na/s \ll Na/r \ll Na/R \quad (3)$$

Accordingly, from the results of the considerations above, the maximum value of the division number m that satisfies inequality (1) is obtained as the actual division number.

Note that as a result of executing simulations with respect to inequality (1), it was discovered that an optimal division number m is constant regardless of the size of the total number of pages Na of the print job data.

In addition, $Na/s \ll Na/r$ of inequality (3) is satisfied because while the job division processing speed s (pages/second) only analyzes a portion of the entire job, all data must be analyzed from the first page to a specified page with respect to the expansion disposal processing speed r (pages/second). Therefore, assuming that there are a great number of pages, $s \gg r$. $Na/r \ll Na/R$ of inequality (3) is satisfied because the expansion disposal processing speed r (pages/second) is the speed of expansion processes having light burdens in which data are not stored in the hard disk, while the expansion storage processing speed R (pages/second) is the speed of normal expansion processes in which data are stored in the hard disk, which takes time, resulting in $r \gg R$.

The divided print job data generating section 22 calculates the division number based on inequality (1). However, in the case that there is no value that satisfies inequality (1) (S40: NO), the pieces of divided print job data are not generated, and conventional processes are performed based on the print job data (S42). That is, after expansion storage processes are administered onto the first through last pages of the print job data, bit map data output processes and printing processes are performed in parallel.

On the other hand, in the case that a division number that satisfies inequality (1) exists (S40: YES), the divided print job data generating section 22 generates a number of pieces of divided print job data equal to the division number (S44). That is, m pieces of divided print job data, to each of which Na/m pages are assigned, are generated.

The processes of steps S46 through S54 performed thereafter are the same as those of steps S16 through S24 of the first embodiment.

In the description of the second embodiment, data regarding the print processing speed X is set in advance. However, the present invention is not limited to such a configuration. For example, a table in which model data of printing engines 24 and print processing speeds X are correlated may be stored in the divided print job data generating section 22, model data of the printing engine 24 may be obtained therefrom, and a print processing speed X corresponding to the model may be obtained by referring to the table. By adopting such a configuration, a print processing speed X corresponding to a printing engine 24 may be set in cases that various printing engines 24 are provided and are capable of being utilized separated.

Alternatively, data regarding the print processing speed X may be directly output from the printing engine 24 and obtained by the divided print job data generating section 22, instead of setting the aforementioned table. By adopting this configuration, an appropriate print processing speed X may be obtained in the case that a printing engine 24 of an unknown model type is utilized, to enable setting of an appropriate division number.

In addition, in the second embodiment, the preflight process obtains the parameters for determining the division number. However, the present invention is not limited to such a configuration. For example, a configuration may be adopted, wherein an operator is enabled to input desired settings via predetermined input means.

Next, a printer system that employs a print data generating apparatus according to a third embodiment of the present invention will be described.

In the printer system that employs the second embodiment described above, the number of pieces of divided print job data was determined such that an output process for bit map data of an nth piece of divided print job data, an expansion disposal process and an expansion storage process for an n+1st piece of divided print job data are completed during a print processing time for the nth piece of divided print job data. However, there are cases in which printing results are not favorable when the division number is determined in this manner, and the total number of pages of the print job data is divided by the division number to determine the number of pages to be assigned to each piece of divided print job data.

Specifically, in the case that double sided printing is performed, for example, page data for the front surface and page data for the back surface of a sheet will belong to different pieces of divided print job data if the number of pages assigned to each piece of divided print job data is odd. This will cause a problem that the page which is printed last in each piece of divided print job data will be printed as a single side print. Similarly, in the case that N up printing is performed, a portion of page data for N pages to be printed on a single printing sheet and page data for other pages of the N pages will belong to different pieces of divided print job data if the number of pages assigned to each piece of divided print job data is not a multiple of N. This will cause a problem that the page which is printed last in each piece of divided print job data will only include a portion of the page data among the N pages. That is, problems will occur in cases that printing processes that employ an imposition process, such as double sided printing and N up printing, are performed.

In addition to the restrictions imposed by the imposition processes described above, there are cases in which it is convenient for printing of each piece of divided print job data to be completed according to the paper supply capacity of a paper supply section (not shown) of the printing apparatus, the paper holding capacity of a paper discharge section (not shown) of the printing apparatus, or by the number of printing sheets per package, from a work flow viewpoint or a physical viewpoint.

Therefore, the printer system that employs the third embodiment of the present invention divides print job data by a division number that takes the restrictions imposed by the imposition processes described above, as well as restrictions according to users' wishes, such as paper supply/discharge capacities and numbers of printing sheets per package, into consideration.

The configuration of the printer system of the third embodiment is the same as that of the printer system of the second embodiment illustrated in FIG. 6. Note that the imposition processes are performed by the expansion processing section 23.

In addition, the operation of the printer system of the third embodiment is the same as that of the printer system of the second embodiment, except for the method by which the division number of the print job data is determined. After it is judged that a division number that satisfies inequality (1) exists at step S40 in the flow chart of FIG. 7, the printer system of the third embodiment performs processes to further optimizes the division number.

Figure 10:
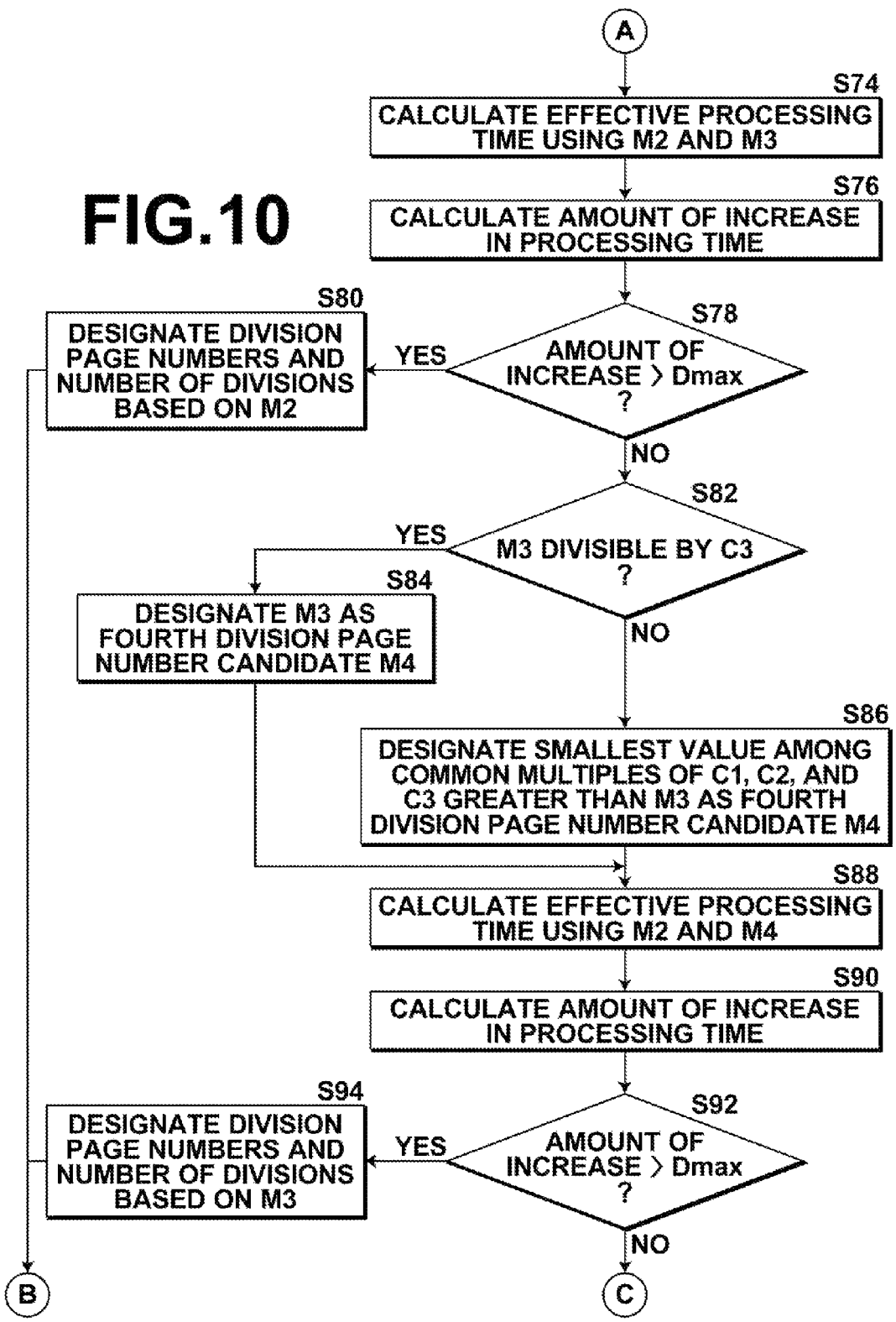
FIG. 10 is a flowchart for explaining the operation of the printer system that employs the third embodiment of a print data generating apparatus of the present invention.
Figure 11:
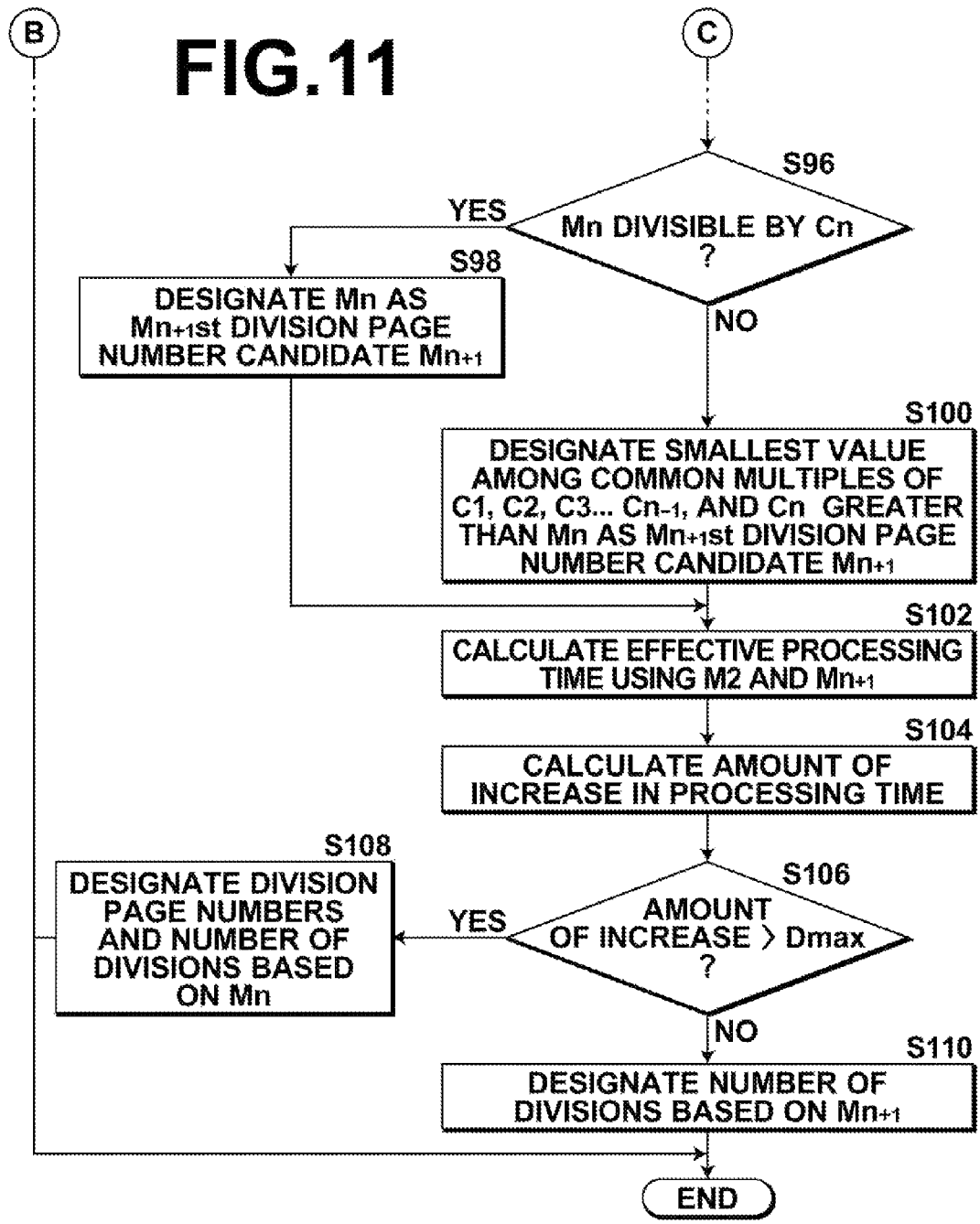
FIG. 11 is a flowchart for explaining the operation of the printer system that employs the third embodiment of a print data generating apparatus of the present invention.

Hereinafter, the operation for optimizing the division number of the print job data will be described with reference to the flow charts illustrated in FIG. 9 through FIG. 11.

First, the divided print job data generating section 22 obtains first through nth reference division page numbers C1 through Cn and an allowable amount of increase in processing time Dmax (S60). Specifically, in the third embodiment, the number of impositions to be performed by the imposition process is obtained as the first reference division page number C1. That is, in the case that imposition processes for double sided printing are performed, the first reference division page number is designated as C1=2. In the case that imposition processes for N (for example, 4) up printing are performed, the first reference division page number is designated as C1=N (for example, 4).

In the third embodiment, the number of sheets per package, the paper supply capacity, and the paper discharge capacity are obtained as the second through nth reference division page numbers C2 through Cn. The second through nth reference division page numbers C2 through Cn are set as desired by a user via a predetermined input section of the computer 10 or via a predetermined input section of the printing apparatus 30. However, the second through nth reference division page numbers C2 through Cn are set such that C1<C2<C3<C4 . . . <Cn−1<Cn.

The allowable amount of increased processing time Dmax is an allowable amount of increase in the total processing time of print data in the case that the division page number and the division number are further optimized in consideration of the workflow and physical viewpoints, with respect to the total processing time of the print job data in the case that the division page number and the division number are optimized in consideration of the restrictions imposed by imposition processes. The allowable amount of increased processing time Dmax is set by a user as desired.

In the third embodiment, the total processing time of the print job data refers to a sum of the job division processing time, the expansion disposal processing time for each piece of divided print job data, the expansion storage processing time for each piece of divided print job data, and the data output processing time. Note that the methods by which these amounts of time are calculated are the same as those of the second embodiment.

After the first through nth reference division page numbers C1 through Cn and the allowable amount of increase in processing time Dmax are obtained, a value obtained by dividing the total number of pages Na of the print job data by a division number m1 that satisfies inequality (1) is calculated as a first division page number candidate M1. Then, whether the first division page number candidate M1 is divisible by the first reference division page number C1 is judged (S62). Note that in the case that Na/m1 yields a quotient and a remainder, the remainder is ignored and the quotient is designated as M1.

In the case that the first division page number candidate M1 is divisible by the first reference division page number C1, the first division page number candidate M1 is designated as a second division page number candidate M2 (S64). On the other hand, in the case that the first division page number candidate M1 is not divisible by the first reference division page number C1, the smallest multiple of the first reference division page number C1 greater than the first division page number candidate M1 is calculated and designated as the second division page number candidate M2 (S66).

Next, whether the second division page number candidate M2 is divisible by the second reference division page number C2 is judged (S68).

In the case that the second division page number candidate M2 is divisible by the second reference division page number C2, the second division page number candidate M2 is designated as a third division page number candidate M3 (S70). On the other hand, in the case that the second division page number candidate M2 is not divisible by the second reference division page number C2, common multiples of the first reference division page number C1 and the second reference division page number C2 greater than the second division page number candidate M2 are calculated, and the smallest value among the common multiples (hereinafter, referred to as "smallest common multiple") is designated as the third division page number candidate M3 (S72).

Next, an effective processing time in the case that the aforementioned second division page number candidate M2 is designated as the division page number and the print job data is processed based on a division number corresponding to the division page number, and an effective processing time in the case that the aforementioned third division page number candidate M3 is designated as the division page number and the print job data is processed based on a division number corresponding to the division page number, are calculated (S74). Here, the total processing time required to process the print job data is calculated from, for example, the job dividing process time, the expansion disposal processing time for each piece of divided print job data, the expansion storage time, the data output processing time, and the printing time illustrated in FIG. 4. Among these amounts of time, the data output processing time and the printing time are constant because the total number of pages in the print job data or the number of pages after imposition processes is the same regardless of the division page number. Therefore, the total value of the data output processing time and the printing time is constant regardless of the division page number. Accordingly, this value is a parameter that need not be considered in the process for determining an optimal division page number and an optimal division number.

Meanwhile, in the case that the division page number and the division number are determined taking the imposition process into consideration as well, there are cases in which the expansion disposal process and the expansion storage process for a current piece of divided print job data cannot be completed within the print processing time of a previous piece of divided print job data. For this reason, it is necessary to take a standby time illustrated in FIG. 12A into consideration as well. Note that FIG. 12B is a timing chart that illustrates the time required for processing by a conventional printing system.

The standby time can be calculated by the following formula.

Standby time=(expansion disposal processing time of a current piece of divided print job data+expansion storage processing time of the current piece of divided print job data)−(printing time of a previous piece of divided print job data−data output processing time of the previous piece of divided print job data)

Note that this standby time is likely to occur when the aforementioned allowable amount of increased processing time Dmax is set to a large value. This is because large reference division numbers are applied, and the division page number becomes great accompanying the large reference division numbers. As a result, the number of pages of a piece of divided print job data which is to be processed first becomes an odd number with a large difference from the numbers of pages of other pieces of divided print job data. Therefore, the processes preceding printing of a following piece of divided print job data cannot be completed during the print processing time of the first piece of divided print job data.

Accordingly, in the present embodiment, an effective processing time is the sum of the "job dividing process time" related to the entirety of the print job data, the "expansion disposal processing time" and the "expansion storage processing time" for the first piece of divided print job data to be processed, and the "standby time" related to a next piece of divided print job data to be processed, based on the results of the considerations above. Then, a difference, which is obtained by subtracting the effective processing time corresponding to a division page number in the case that the first division reference page number C1 is employed (when imposition processes are performed) from the effective processing time for each division page number, is compared against the allowable amount of increased processing time Dmax.

That is, next, an amount of increased effective processing time is calculated, by subtracting the effective processing time in the case that the aforementioned second division page number candidate M2 is designated as the division page number and the print job data is processed based on a division number corresponding to the division page number from the effective processing time in the case that the aforementioned third division page number candidate M3 is designated as the division page number and the print job data is processed based on a division number corresponding to the division page number (S76).

The amount of increased effective processing time is compared against the allowable amount of increased processing time Dmax. If the amount of increased effective processing time is greater than the allowable amount of increased processing time Dmax (S78: YES), the division page number and the division number based on the second divided page number candidate M2 are determined as the final division page number and the final division number (S80).

On the other hand, if the amount of increased effective processing time is less than or equal to the allowable amount of increased processing time Dmax (S78: NO), whether the third division page number candidate M3 is divisible by the third reference division page number C3 is judged (S82).

In the case that the third division page number candidate M3 is divisible by the third reference division page number C3, the third division page number candidate M3 is designated as a fourth division page number candidate M4 (S84). On the other hand, in the case that the third division page number candidate M3 is not divisible by the second reference division page number C3, the smallest common multiple of the first reference division page number C1, the second reference division page number C2 and the third reference division page number C3 greater than the third division page number candidate M3 is calculated, and designated as the fourth division page number candidate M4 (S86).

Next, a effective processing time in the case that the aforementioned second division page number candidate M2 is designated as the division page number and the print job data is processed based on a division number corresponding to the division page number, and the effective processing time in the case that the aforementioned fourth division page number candidate M4 is designated as the division page number and the print job data is processed based on a division number corresponding to the division page number, are calculated (S88).

Then, an amount of increased effective processing time is calculated, by subtracting the effective processing time in the case that the aforementioned second division page number candidate M2 is designated as the division page number and the print job data is processed based on a division number corresponding to the division page number from the effective processing time in the case that the aforementioned fourth division page number candidate M4 is designated as the division page number and the print job data is processed based on a division number corresponding to the division page number (S90).

The amount of increased effective processing time is compared against the allowable amount of increased processing time Dmax. If the amount of increased effective processing time is greater than the allowable amount of increased processing time Dmax (S92: YES), the division page number and the division number based on the third divided page number candidate M3 are determined as the final division page number and the final division number (S94).

On the other hand, if the amount of increased effective processing time calculated in step S90 is less than or equal to the allowable amount of increased processing time Dmax (S92: NO), whether the fourth division page number candidate M4 is divisible by a fourth reference division page number C4 is judged.

Thereafter, the processes of steps S68 through S80 and the processes of steps S82 through S94 are repeated until judgment is performed regarding a division page number and a division number based on the nth reference division page number Cn.

That is, ultimately, whether the nth division page number candidate Mn is divisible by the nth reference division page number Cn is judged (S96).

In the case that the nth division page number candidate Mn is divisible by the nth reference division page number Cn, the nth division page number candidate Mn is designated as a n+1st division page number candidate Mn+1 (S98). On the other hand, in the case that the nth division page number candidate Mn is not divisible by the nth reference division page number Cn, the smallest common multiple of the first through nth reference divided page numbers C1 through Cn that exceeds the nth divided page number candidate Mn is calculated and designated as a n+1st divided page number candidate Mn+1 (S100).

Next, a effective processing time in the case that the aforementioned second division page number candidate M2 is designated as the division page number and the print job data is processed based on a division number corresponding to the division page number, and the effective processing time in the case that the aforementioned n+1st division page number candidate Mn+1 is designated as the division page number and the print job data is processed based on a division number corresponding to the division page number, are calculated (S102).

Then, an amount of increased effective processing time is calculated, by subtracting the effective processing time in the case that the aforementioned second division page number candidate M2 is designated as the division page number and the print job data is processed based on a division number corresponding to the division page number from the effective processing time in the case that the aforementioned Mn+1st division page number candidate Mn+1st is designated as the division page number and the print job data is processed based on a division number corresponding to the division page number (S104).

The amount of increased effective processing time is compared against the allowable amount of increased processing time Dmax. If the amount of increased effective processing time is greater than the allowable amount of increased processing time Dmax (S106: YES), the division page number and the division number based on the nth divided page number candidate Mn are determined as the final division page number and the final division number (S108).

On the other hand, if the amount of increased effective processing time calculated in step S104 is less than or equal to the allowable amount of increased processing time Dmax (S106: NO), the division page number and the division number based on the n+1st divided page number candidate Mn+1 are determined as the final division page number and the final division number (S110).

Then, after the optimized division number is determined as described above, the pieces of divided print job data are generated based on the division number. The processes following the generation of the pieces of divided print job data are the same as those performed by the printer systems of the first and second embodiments.

The operation of the printer system of the third embodiment will be described hereinafter using specific numerical values as examples. Here, a case will be described, in which the total number of pages Na of print job data is designated as Na=32758, the division number m1 that satisfies inequality (1), calculated by the printer system of the second embodiment is designated as m1=5, the first reference division page number (imposition number N) is designated as C1=2, the second reference division page number is designated as C2=100, the third reference division page number is designated as C3=500, and the allowable increased amount in processing time Dmax is designated as 180 (seconds).

First, the divided print job data generating section 22 obtains first through third reference division page numbers C1 through C3 and an allowable increased amount in processing time Dmax (S60). Specifically, the aforementioned values for the first reference division page number (imposition number N), designated as C1=2, the second reference division page number, designated as C2=100, the third reference division page number, designated as C3=500, and the allowable increased amount in processing time Dmax, designated as 180 (seconds), are obtained.

After the first through third reference division page numbers C1 through C3 and the allowable increased amount in processing time Dmax are obtained, a value obtained by dividing the total number of pages Na=32758 of the print job data by the division number m1=5 that satisfies inequality (1), is calculated as a first division page number candidate M1. Then, whether the first division page number candidate M1 is divisible by the first reference division page number C1 is judged (S62). Specifically, Na/m1=32758/5 is calculated, to obtain M1=6552. Then, whether the first division page number candidate M1=6552 is divisible by the first reference division page number C1=2 is judged.

In this case, M1/C1=6552/2=3276, which is divisible. Therefore, the first division page number candidate M1=6552 is obtained as is as a second division page number candidate M2 (S64).

Next, whether the second division page number candidate M2=6552 obtained as described above is divisible by the second reference division page number C2=100 is judged (S68).

In this case, because the second division page number candidate M2=6552 is not divisible by the second reference division page number C2=100, the smallest common multiple of the first reference division page number C1=2 and the second reference division page number C2=100 that exceeds the second division page number candidate M2=6552 is calculated, and the smallest common multiple is designated as a third division page number candidate M3 (S72). Specifically, the smallest common multiple of the first reference division page number C1=2 and the second reference division page number C2=100 that exceeds the second division page number candidate M2=6552 is 6600. Therefore, the third division page number candidate M3=6600 is obtained.

Next, an effective processing time in the case that the aforementioned second division page number candidate M2=6552 is designated as the division page number and the print job data is processed based on a division number corresponding to the division page number, and an effective processing time in the case that the aforementioned third division page number candidate M3=6600 is designated as the division page number and the print job data is processed based on a division number corresponding to the division page number, are calculated (S74). Note that at this time, the division number corresponding to the second division page number candidate M2=6552 and the division number corresponding to the third division page number candidate M3 are both 5.

Specifically, the effective processing time for a case in which the second division page number candidate M2=6552 is designated as the division page number and the print job data is processed based on a division number corresponding to the division page number is calculated as follows. Note that as described with respect to the second embodiment, Na is the total number of pages in the print job data, m is the division number, s is the job division processing speed, r is the expansion disposal processing speed, R is the expansion processing speed, t is the data output processing speed, and X is the print processing speed. Here, calculations are performed assuming that Na=32758 (pages), s=42000 (pages/sec), r=50 (pages/second), R=7.5 (pages/second), t=5 (pages/second), and X=2.5 (pages/second).

Processing time for the entirety of the print job data+processing time for the fifth piece of divided print job data: division processing time+expansion disposal processing time+expansion storage processing time+data output processing time=Na·m/s+{division page number·(m−1)}/r+{Na−division page number·(m−1)}/R=32758.5/42000+{6552(5−1)}/50+{32758−6552(5−1)}/7.5≈1401

Processing time for the fourth through first pieces of divided print job data: standby time=(expansion disposal processing time of a current piece of divided print job data+expansion storage processing time of the current piece of divided print job data)−(printing time of a previous piece of divided print job data−data output processing time of the previous piece of divided print job data)

Because the standby times for the fourth through first pieces of divided print job data are negative values, they will be counted as 0 here.

Accordingly, the effective processing time for the print job data in the case that the second division page number candidate number M2=6552 is designated as the division page number and the division number is set to 5 is 1401 (seconds)≈23.4 (minutes).

Meanwhile, the effective processing time for the print job data in the case in which the third division page number candidate M3=6600 is designated as the division page number and the division number is set to 5 is calculated as follows.

Processing time for the entirety of the print job data+processing time for the fifth piece of divided print job data: division processing time+expansion disposal processing time+expansion storage processing time=Na·m/s+{division page number·(m−1)}/r+{Na−division page number·(m−1)}/R=32758.5/42000+{6600(5−1)}/50+{32758−6600(5−1)}/7.5≈1380

Processing time for the fourth piece of divided print job data: standby time=(expansion disposal processing time of a current piece of divided print job data+expansion storage processing time of the current piece of divided print job data)−(printing time of a previous piece of divided print job data−data output processing time of the previous piece of divided print job data)=[{division page number·(m−2)}/r+division page number/R]−[{Na−division page number·(m−1)}/X−{Na−division page number·(m−1)}/t]=[{6600(5−2)}/50+6600/7.5]−[{32758−6600(5−1)}/2.5−{32758−6600(5−1)}/5]≈4

Processing time for the third through first pieces of divided print job data: standby time=(expansion disposal processing time of a current piece of divided print job data+expansion storage processing time of the current piece of divided print job data)−(printing time of a previous piece of divided print job data−data output processing time of the previous piece of divided print job data)

Because the standby times for the third through first pieces of divided print job data are negative values, they will be counted as 0 here.

Accordingly, the effective processing time for the print job data in the case that the third division page number candidate number M3=6600 is designated as the division page number and the division number is set to 5 is 1380 (seconds)+4 (seconds)≈23.1 (minutes).

Next, an amount of increased effective processing time is calculated, by subtracting the effective processing time in the case that the print job data is processed using the division number (5) and the division page number (6552) based on the second division page number candidate M2 from the effective processing time in the case that the print job data is processed using the division number (5) and the division page number (6600) based on the third division page number candidate M3 (S76). Specifically, the amount of increase in effective processing time is as follows, form the above calculation results.

23.1 (minutes)−23.4 (minutes)=−0.3 (minute)=−18 (seconds)

The amount of increased total processing time is compared against the allowable amount of increased processing time Dmax. If the amount of increased total processing time is greater than the allowable amount of increased processing time Dmax (S78: YES), the division page number (6552)

and the division number (5) based on the second divided page number candidate M2 are determined as the final division page number and the final division number (S80). On the other hand, if the amount of increased total processing time is less than or equal to the allowable amount of increased processing time Dmax (S78: NO), whether the third division page number candidate M3=6600 is divisible by the third reference division page number C3=500 is judged (S82).

As described above, the effective processing time is reduced here, and therefore a description will be given for a case in which the amount of increased total processing time is less than Dmax. In this case, the third division page number candidate M3=6600 is not divisible by the third reference division page number C3=500. Therefore, the smallest common multiple of the first through third reference division page numbers C1 through C3 that exceeds the third division page number candidate M3=6600 is calculated, and the value of the smallest common multiple is designated as a fourth division page number candidate M4 (S86). The smallest common multiple of the first through third reference division page numbers C1 through C3 is 7000, and therefore the fourth division page number candidate M4 is obtained as M4=7000.

Next, an effective processing time in the case that the print job data is processed using the division number (5) and the division page number (6552) based on the second division page number candidate M2 and an effective processing time in the case that the print job data is processed using a division number (4) and the division page number (7000) based on the fourth division page number candidate M4 are calculated (S88).

Specifically, the effective processing time in the case that the print job data is processed using the division number (5) and the division page number (6552) based on the second division page number candidate M2 is the same as that described above. The effective processing time in the case that the print job data is processed using a division number (5) and the division page number (7000) based on the fourth division page number candidate M4 is calculated as follows:

Processing time for the entirety of the print job data+ processing time for the fifth piece of divided print job data: division processing time+expansion disposal processing time+expansion storage processing time=Nam/s+{division page number·(m−1)}/r+{Na−division page number·(m−1)}/R=32758.5/42000+{7000(5−1)}/50+{32758−7000(5−1)}/7.5≈1198

Processing time for the fourth piece of divided print job data: standby time=(expansion disposal processing time of a current piece of divided print job data+expansion storage processing time of the current piece of divided print job data)−(printing time of a previous piece of divided print job data−data output processing time of the previous piece of divided print job data)=[{division page number·(m−2)}/r+ division page number/R]−[{Na−division page number·(m−1)}/X−{Na−division page number·(m−1)}/t]=[{7000(5−2)}/50+7000/7.5]−[{32758−7000(5−1)}/2.5−{32758−7000(5−1)}/5]≈402

Processing time for the third through first pieces of divided print job data: standby time=(expansion disposal processing time of a current piece of divided print job data+expansion storage processing time of the current piece of divided print job data)−(printing time of a previous piece of divided print job data−data output processing time of the previous piece of divided print job data)

Because the standby times for the third through first pieces of divided print job data are negative values, they will be counted as 0 here.

Accordingly, the effective processing time for the print job data in the case that the fourth division page number candidate number M4=7000 is designated as the division page number and the division number is set to 5 is 1198 (seconds)+402 (seconds)≈26.7 (minutes).

Next, an amount of increased effective processing time is calculated, by subtracting the total processing time in the case that the print job data is processed using the division number (5) and the division page number (6552) based on the second division page number candidate M2 from the effective processing time in the case that the print job data is processed using the division number (5) and the division page number (7000) based on the fourth division page number candidate M4 (S90). Specifically, the amount of increase in effective processing time is as follows, form the above calculation results.

26.7 (minutes)−23.4 (minutes)=3.3 (minutes)≈198 (seconds)

The amount of increased total processing time is compared against the allowable amount of increased processing time Dmax. If the amount of increased total processing time is greater than the allowable amount of increased processing time Dmax (S92: YES), the division page number (6600) and the division number (5) based on the third divided page number candidate M3 are determined as the final division page number and the final division number (S94). On the other hand, if the amount of increased total processing time is less than or equal to the allowable amount of increased processing time Dmax (S92: NO), the division page number (7000) and the division number (5) based on the fourth division page number candidate M4 are determined as the final division page number and the final division number. Here, the amount of increased effective processing time is 198 (seconds), which is a greater value than the allowable amount of increased processing time Dmax. Therefore, division page number (6600) and the division number (5) based on the third divided page number candidate M3 is determined as the final division page number and the final division number.

According to the printer system of the third embodiment, the print job data are divided by a division number that takes the restrictions imposed by imposition processes, as well as restrictions according to user's wishes, such as paper supply/ discharge capacities and the number of sheets per package, into consideration. Therefore, appropriate printing results can be obtained, and convenience can also be improved from a workflow viewpoint and a physical viewpoint.

Note that in the printer system of the third embodiment, the second through nth reference division page numbers were set in addition to the first reference division page number, which is based on the number of impositions of imposition processes. Alternatively, only the first reference division page number, which is based on the number of impositions of imposition processes, may be set without setting the second through nth reference division page numbers.

Figure 9:
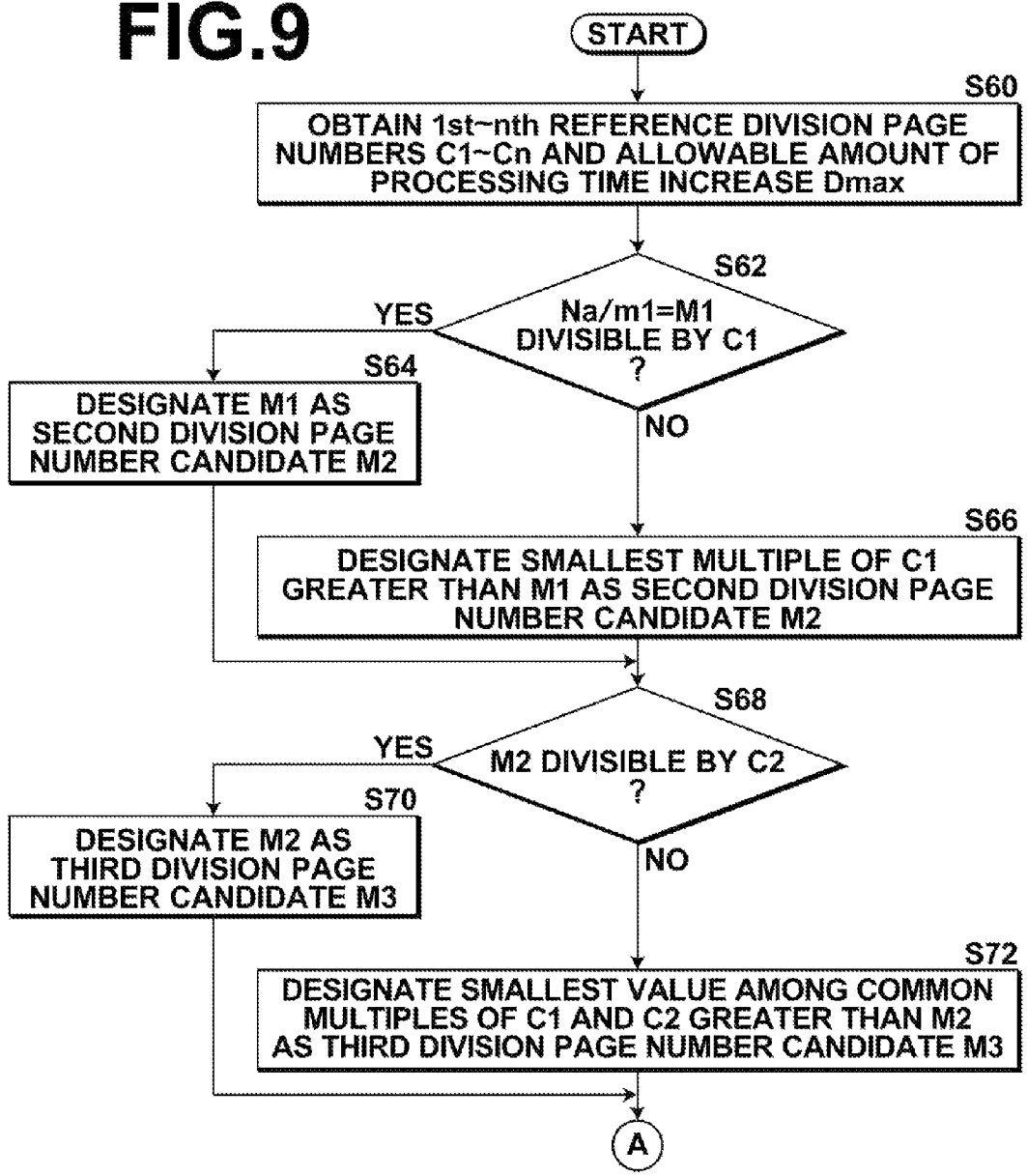
FIG. 9 is a flow chart for explaining the operation of the printer system that employs a third embodiment of a print data generating apparatus of the present invention.

In such a case, after it is judged whether the first division page number candidate M1 is divisible by the first reference division page number C1 at step S62 of FIG. 9, the first division page number candidate M1 is designated as the division page number and the print job id divided using a division number corresponding to the division page number, in the case that the first division page number candidate M1 is divisible by the first reference division page number C1. on the other hand, in the case that the first division page number candidate M1 is not divisible by the first reference division page number C1, the smallest multiple of the first reference division page number C1 that exceeds the first division page number candidate M1 is calculated, the smallest multiple is designated as the division page number, and the print job id divided using a division number corresponding to the division page number.

In the printer system of the third embodiment, the first through nth reference division page numbers C1 through Cn were set such that the values thereof satisfied the inequality C1<C2<C3<C4 . . . <Cn−1<Cn. In the case that a user sets second through nth reference division page numbers C2 through Cn that do not satisfy the aforementioned inequality, the user may be notified that the set values are not appropriate, by displaying a warning message or the like.

What is claimed is:

1. A print data generating apparatus, comprising:
a print job data receiving section, for receiving print job data having a print data for a plurality of pages and which are recognizable by a printing section;
a divided print job data generating section, for dividing the plurality of pages into groups of a predetermined number of pages, and for assigning the divided plurality of pages to the print job data received by the print job data receiving section, to generate a plurality of pieces of divided print job data; and
an expansion processing section, for arranging the pieces of divided print job data generated by the divided print job data generating section in reverse order of page numbers, for generating page data for each page by administering expansion processes on the pieces of divided print job data in the order that they are arranged, and for outputting the page data for each piece of divided print job data in reverse order of page numbers and in the order that the expansion processes are administered, to the printing section;
wherein:
the expansion processing section discards page data for pages other than pages assigned to each piece of divided print job data.

2. The print data generating apparatus as defined in claim 1, wherein:
the expansion processing section administers a first expansion process to pages assigned to each piece of divided print job data and a second expansion process to pages other than the pages assigned to each piece of divided print job data, the first expansion process and the second expansion process being different; and
the second expansion process being that having a lighter processing load than that of the first expansion process.

3. A print data generating apparatus as defined in claim 2, wherein:
the expansion processing section administers a first expansion process having a relatively heavy processing load onto pages which are assigned to the divided print jobs and are to be printed, and administers a second expansion process having a relatively light processing load onto pages other than the pages onto which the first expansion process is administered, and which are discarded without being stored.

4. A print data generating apparatus as defined in claim 1, comprising:
a print job data receiving section, for receiving print job data having a print data for a plurality of pages and which are recognizable by a printing section;
a divided print job data generating section, for dividing the plurality of pages into groups of a predetermined number of pages, and for assigning the divided plurality of pages to the print job data received by the print job data receiving section, to generate a plurality of pieces of divided print job data; and
an expansion processing section, for arranging the pieces of divided print job data generated by the divided print job data generating section in reverse order of page numbers, for generating page data for each page by administering expansion processes on the pieces of divided print job data in the order that they are arranged, and for outputting the page data for each piece of divided print job data in reverse order of page numbers and in the order that the expansion processes are administered, to the printing section;
wherein:
the expansion processing section initiates the expansion process for an n+1st divided print job data at a point in time when the expansion process and the output process of the page data of an nth (n is an integer having a value of 1 or greater) piece of divided print job data are complete.

5. A print data generating apparatus, comprising:
a print job data receiving section, for receiving print job data having a print data for a plurality of pages and which are recognizable by a printing section;
a divided print job data generating section, for dividing the plurality of pages into groups of a predetermined number of pages, and for assigning the divided plurality of pages to the print job data received by the print job data receiving section, to generate a plurality of pieces of divided print job data; and
an expansion processing section, for arranging the pieces of divided print job data generated by the divided print job data generating section in reverse order of page numbers, for generating page data for each page by administering expansion processes on the pieces of divided print job data in the order that they are arranged, and for outputting the page data for each piece of divided print job data in reverse order of page numbers and in the order that the expansion processes are administered, to the printing section;
wherein:
the divided print job data generating section determines the number of groups into which the print job data is to be divided such that a sum of an amount of time required for an output process for the page data of the nth piece of divided print job data and an amount of time required for the expansion process for the n+1st piece of divided print job data is less than the amount of time required for the printing process of the nth piece of divided print job data; and
the divided print job data generating section determines the greatest value of m that satisfies the following inequality (1) as the number of groups into which the print job data is to be divided:

$$Na/mX-(Na/mt+\{Na(m-2)\}/mr+Na/mR)>0 \quad (1)$$

wherein Na is the total number of pages of the print job data; r is the speed of the expansion process for pages other than the pages assigned to the piece of divided print job data; R is the speed of the expansion process for pages assigned to the piece of divided print job data; t is the speed of the output process for the page data of the piece of divided print job data; and X is the speed of the printing process of the printing section.

6. A print data generating apparatus as defined in claim 5, further comprising:
a preflight processing section, for obtaining at least one of: the total number of pages of the print job data Na; the speed of the expansion process for pages other than the pages assigned to the piece of divided print job data r; the speed of the expansion process for pages assigned to the piece of divided print job data R; and the speed of the output process for the page data of the piece of divided print job data t, by analyzing the contents of the print job data.

7. A print data generating apparatus as defined in claim 5, further comprising:
an input section, capable of inputting settings for at least one of: the total number of pages of the print job data Na; the speed of the expansion process for pages other than the pages assigned to the piece of divided print job data r; the speed of the expansion process for pages assigned to the piece of divided print job data R; and the speed of the output process for the page data of the piece of divided print job data t.

8. A print data generating apparatus as defined in claim 5, wherein:
the divided print job data generating section has a table in which a plurality of types of printing sections and data regarding the speeds of printing processes corresponding to each type of printing section are correlated; and
the data regarding the speed of the printing process is obtained by obtaining the type of the printing section and referring to the table.

9. A print data generating apparatus as defined in claim 5, wherein:
the divided print job data generating section obtains data regarding the speed of the printing process, which are output from the printing section.

10. A print data generating apparatus, comprising:
a print job data receiving section, for receiving print job data having a print data for a plurality of pages and which are recognizable by a printing section;
a divided print job data generating section, for dividing the plurality of pages into groups of a predetermined number of pages, and for assigning the divided plurality of pages to the print job data received by the print job data receiving section, to generate a plurality of pieces of divided print job data;
an expansion processing section, for arranging the pieces of divided print job data generated by the divided print job data generating section in reverse order of page numbers, for generating page data for each page by administering expansion processes on the pieces of divided print job data in the order that they are arranged, and for outputting the page data for each piece of divided print job data in reverse order of page numbers and in the order that the expansion processes are administered, to the printing section; and
an imposition processing section, for performing imposition processes based on the page data;
wherein:
the divided print job data generating section:
determines the number of groups into which the print job data is to be divided such that the expansion process for an n+1st (n is a integer having a value of 1 or greater) piece of divided print job data is completed during printing processes for the page data of an nth piece of divided print job data by the printing section;
obtains the number of impositions when the imposition processes are to be performed, obtains a preset reference division page number which is greater than the number of impositions;
judges whether a first division page number candidate, obtained by dividing the total number of pages of the print job data by the number of groups, is divisible by the number of impositions;
designates the first division page number candidate as a division page number as a second division page number candidate in the case that the first division page number candidate is divisible by the number of impositions;
designates the smallest multiple of the number of impositions that exceeds the first division page number candidate as a second division page number candidate in the case that the first division page number candidate is not divisible by the number of impositions;
judges whether the second division page number candidate is divisible by the reference division page number;
designates the second division page number candidate as a third division page number candidate in the case that the second division page number candidate is divisible by the reference division page number;
designates the smallest value among common multiples of the number of impositions and the reference division page number that exceed the second division page number candidate as a third division page number candidate in the case that the second division page number candidate is not divisible by the reference division page number;
performs the division using a division page number and a number of groups based on the third division page number candidate in the case that the difference in processing time between a case that the second division page number candidate is designated as a division page number and the division is performed using a number of groups based on the division page number and a case that the third division page number candidate is designated as a division page number and the division is performed using a number of groups based on the division page number is less than or equal to a preset allowable amount of increase in processing time; and
performs the division using a division page number and a number of groups based on the second division page number candidate in the case that the difference is greater than the allowable amount of increase in processing time.

11. A print data generating apparatus, comprising:
a print job data receiving section, for receiving print job data having a print data for a plurality of pages and which are recognizable by a printing section;
a divided print job data generating section, for dividing the plurality of pages into groups of a predetermined number of pages, and for assigning the divided plurality of pages to the print job data received by the print job data receiving section, to generate a plurality of pieces of divided print job data;
an expansion processing section, for arranging the pieces of divided print job data generated by the divided print job data generating section in reverse order of page numbers, for generating page data for each page by administering expansion processes on the pieces of divided print job data in the order that they are arranged, and for outputting the page data for each piece of divided print job data in reverse order of page numbers and in the order that the expansion processes are administered, to the printing section; and an imposition processing section, for performing imposition processes based on the page data;

wherein:

the divided print job data generating section:

determines the number of groups into which the print job data is to be divided such that the expansion process for an n+1st (n is a integer having a value of 1 or greater) piece of divided print job data is completed during printing processes for the page data of an nth piece of divided print job data by the printing section;

obtains the number of impositions when the imposition processes are to be performed as a first reference division page number, and one or k (k is an integer having a value from 2 to x) reference division page numbers greater than the first reference division page number;

judges whether a first division page number candidate, obtained by dividing the total number of pages in the print job data divided by the number of groups, is divisible by the first reference division page number;

designates the first division page number candidate as a second division page number candidate in the case that the first division page number candidate is divisible by the first reference division page number;

designates the smallest multiple of the first reference division page number that exceeds the first division page number candidate as a second division page number candidate in the case that the first division number candidate is not divisible by the first reference division number;

judges whether a kth division page number candidate is divisible by a kth reference division page number;

designates the kth division page number candidate as a k+1st division page number candidate in the case that the kth division number candidate is divisible by the kth reference division page number;

sequentially judges whether the difference in processing time for the print job data between a case in which the smallest value among common multiples of the first through kth reference division page number that exceed the kth division page number candidate is designated as the k+1st division page number candidate, the second division page number candidate is designated as the division page number, and the division is performed using a number of groups based on the division page number, and a case in which the k+1st division page number candidate is designated as the division page number, and the division is performed using a number of groups based on the division page number, exceeds a preset allowable amount of increase in processing time, while increasing the value of k from 2 in the case that the kth division number candidate is not divisible by the kth reference division page number;

performs the division based on a division page number and a number of groups based on the kth division page number candidate at the point in time at which the difference exceeds the allowable amount of increase in processing time in the case that the difference exceeds the allowable amount of increase in processing time; and performs the division based on a division page number and a number of groups based on an x+1st division page number candidate in the case that the difference is less than or equal to the allowable amount of increase in processing time when k reaches the value x.

\* \* \* \* \*